US012695418B2

(12) United States Patent
Yang et al.

(10) Patent No.: US 12,695,418 B2
(45) Date of Patent: Jul. 28, 2026

(54) TESTING DEVICE AND METHOD FOR TESTING PHOTOVOLTAIC MODULE

(71) Applicant: JINKO SOLAR (HAINING) CO., LTD., Haining City (CN)

(72) Inventors: Sen Yang, Haining City (CN); Ning Li, Haining City (CN); Pengjun Xiao, Haining City (CN); Bo Li, Haining City (CN); Jiaxiang Yin, Haining City (CN)

(73) Assignee: JINKO SOLAR (HAINING) CO., LTD., Haining City (CN)

( * ) Notice: Subject to any disclaimer, the term of this patent is extended or adjusted under 35 U.S.C. 154(b) by 595 days.

(21) Appl. No.: 18/090,715

(22) Filed: Dec. 29, 2022

(65) Prior Publication Data

US 2024/0195355 A1 Jun. 13, 2024

(30) Foreign Application Priority Data

Dec. 12, 2022 (CN) .......................... 202211599370.2
Dec. 12, 2022 (CN) .......................... 202211610645.8
(Continued)

(51) Int. Cl.
*H02S 50/10* (2014.01)

(52) U.S. Cl.
CPC .................................... *H02S 50/10* (2014.12)

(58) Field of Classification Search
CPC ................................................ H02S 50/00–10
See application file for complete search history.

(56) References Cited

U.S. PATENT DOCUMENTS 6,271,462 B1* 8/2001 Tsuzuki ................. H10F 71/00
                                                                    438/57
8,534,134 B2* 9/2013 Buehler ................... G01N 3/12
                                                                    73/798
(Continued)

FOREIGN PATENT DOCUMENTS

CN 104330309 A 2/2015
CN 106989883 A 7/2017
(Continued)

OTHER PUBLICATIONS

IEC 61215-2, International Electrotechnical Commission (IEC), Feb. 2021 (Year: 2021).*
(Continued)

*Primary Examiner* — Judy Nguyen
*Assistant Examiner* — James Split
(74) *Attorney, Agent, or Firm* — Burris Law, PLLC

(57) ABSTRACT

A test device and a method for testing a photovoltaic module, for testing anti-stepping performance of the photovoltaic module. A test member is configured to abut against the photovoltaic module and apply a preset load to the photovoltaic module, to simulate force on the photovoltaic module when an operator walks on a surface of the photovoltaic module, so as to easily adjust and replace the material and the manufacturing process of the photovoltaic module according to test results, so that the photovoltaic module has stronger anti-stepping performance, thereby prolonging the service life of the photovoltaic module. The test member is provided with an abutment surface for abutting against the photovoltaic module, and an area S of the abutment surface satisfies: 50 cm$^2$≤S≤400 cm$^2$, which improves accuracy and reliability of the test results of the test device, thereby improving operation performance of the test device.

13 Claims, 10 Drawing Sheets

(30) Foreign Application Priority Data

| | | |
|---|---|---|
| Dec. 12, 2022 | (CN) .......................... | 202223341463.3 |
| Dec. 12, 2022 | (CN) .......................... | 202223361702.1 |

(56) References Cited

U.S. PATENT DOCUMENTS

| | | | | |
|---|---|---|---|---|
| 10,197,482 | B2 * | 2/2019 | Gao .......................... | G01N 3/20 |
| 11,349,433 | B2 * | 5/2022 | Han .......................... | H02S 50/15 |
| 2011/0283806 | A1 | 11/2011 | Buehler et al. | |
| 2013/0167907 | A1 | 7/2013 | Bitarchas et al. | |
| 2019/0199284 | A1 * | 6/2019 | Sun .......................... | H02S 50/15 |
| 2019/0199285 | A1 * | 6/2019 | Sun .......................... | H02S 50/15 |
| 2021/0028746 | A1 | 1/2021 | Hacke | |
| 2021/0211095 | A1 | 7/2021 | Xu et al. | |

FOREIGN PATENT DOCUMENTS

| | | | | | |
|---|---|---|---|---|---|
| CN | 206960267 | U | | 2/2018 | |
| CN | 207135068 | U | | 3/2018 | |
| CN | 107968620 | A | * | 4/2018 | ............ E04D 13/00 |
| CN | 108444824 | A | | 8/2018 | |
| CN | 108548657 | A | | 9/2018 | |
| CN | 110414026 | A | | 11/2019 | |
| CN | 110595742 | A | | 12/2019 | |
| CN | 111313832 | A | | 6/2020 | |
| CN | 211042675 | U | | 7/2020 | |
| CN | 212534829 | U | | 2/2021 | |
| CN | 213121052 | U | | 5/2021 | |
| CN | 112903486 | A | * | 6/2021 | .............. G01N 3/32 |
| CN | 213626319 | U | | 7/2021 | |
| CN | 113612443 | A | | 11/2021 | |
| CN | 113984541 | A | | 1/2022 | |
| CN | 114070197 | A | | 2/2022 | |
| CN | 114892902 | A | | 8/2022 | |
| CN | 115065308 | A | | 9/2022 | |
| CN | 217461231 | U | | 9/2022 | |
| CN | 217537576 | U | | 10/2022 | |
| CN | 217878688 | U | | 11/2022 | |
| CN | 217975106 | U | | 12/2022 | |
| CN | 115800913 | A | | 3/2023 | |
| CN | 115811277 | A | | 3/2023 | |
| CN | 115987215 | A | | 4/2023 | |
| CN | 219181462 | U | | 6/2023 | |
| CN | 219532738 | U | | 8/2023 | |
| KR | 20110137847 | A | | 12/2011 | |
| KR | 20160087582 | A | | 7/2016 | |
| KR | 20170132041 | A | | 12/2017 | |
| KR | 20190026177 | A | | 3/2019 | |
| WO | WO-2010092665 | A1 | * | 8/2010 | ............ H10F 71/00 |
| WO | 2011045434 | A2 | | 4/2011 | |
| WO | 2020231683 | A1 | | 11/2020 | |

OTHER PUBLICATIONS

Extended European Search Report issued in corresponding EP Application 23156254.7, issued Sep. 13, 2023, 6 pages.

Patent search report; Date of Mailing: Oct. 28, 2022(12 pages).

International Search Report (PCT/CN2023/105098); Date of Mailing: Aug. 18, 2023(7 pages).

International Search Report (PCT/CN2023/105113); Date of Mailing: Sep. 22, 2023(8 pages).

International Search Report (PCT/CN2023/105126); Date of Mailing: Oct. 7, 2023(7 pages).

International Search Report (PCT/CN2023/105065); Date of Mailing: Aug. 17, 2023(8 pages).

International Search Report (PCT/CN2023/105134); Date of Mailing: Sep. 27, 2023(7 pages).

International Search Report (PCT/CN2023/105145); Date of Mailing: Oct. 11, 2023(8 pages).

International Search Report (PCT/CN2023/105160); Date of Mailing: Oct. 13, 2023(8 pages).

US Office Action for U.S. Appl. No. 18/090,690, mailed Aug. 13, 2025 (19 pages).

European Office Action for Application No. 23156254.7, mailed Oct. 11, 2025 (4 pages).

Patent search report 1; Date of Mailing: Oct. 28, 2022(18 pages).

Patent search report 2; Date of Mailing: Oct. 27, 2022(8 pages).

Yang, Xiaojun et al."Research on the Pressure Resistance of Photovoltaic Modules Under Different Aluminum Frame Structures", Popular Standardization, Sep. 23, 2020 (Sep. 23, 2020) pp. 153-154.

Proceedings / EU PVSEC 2013, 28th European Photovoltaic Solar Energy Conference and Exhibition, Parc Des Expositions Paris Nord Villepinte, Paris, France, Conference Sep. 30-Oct. 4, 2013, Exhibition Oct. 1-3, 2013 : The Most Inspiring PL, Dec. 16, 2013 (Dec. 16, 2013), XP040635916, ISBN: 978-3-936338-33-1.

IEC 61215-2, Terrestrial photovoltaic (PV) modules—Design qualification and type approval—Part 2: Test procedures, Feb. 24, 2021(57 pages).

* cited by examiner

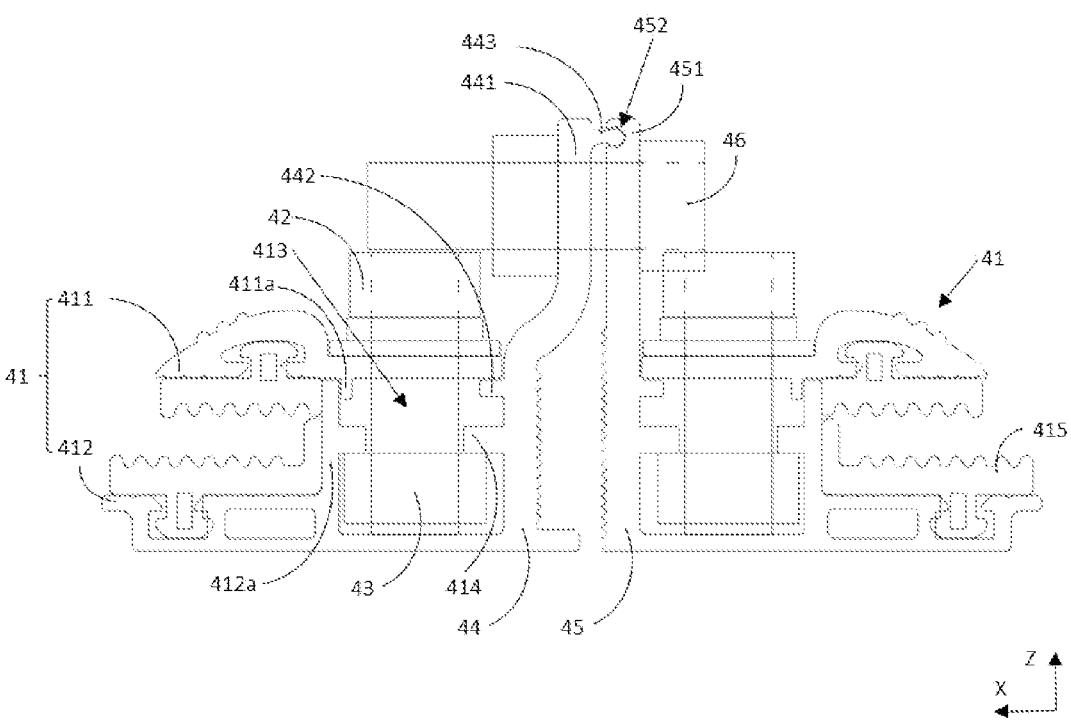
FIG. 5
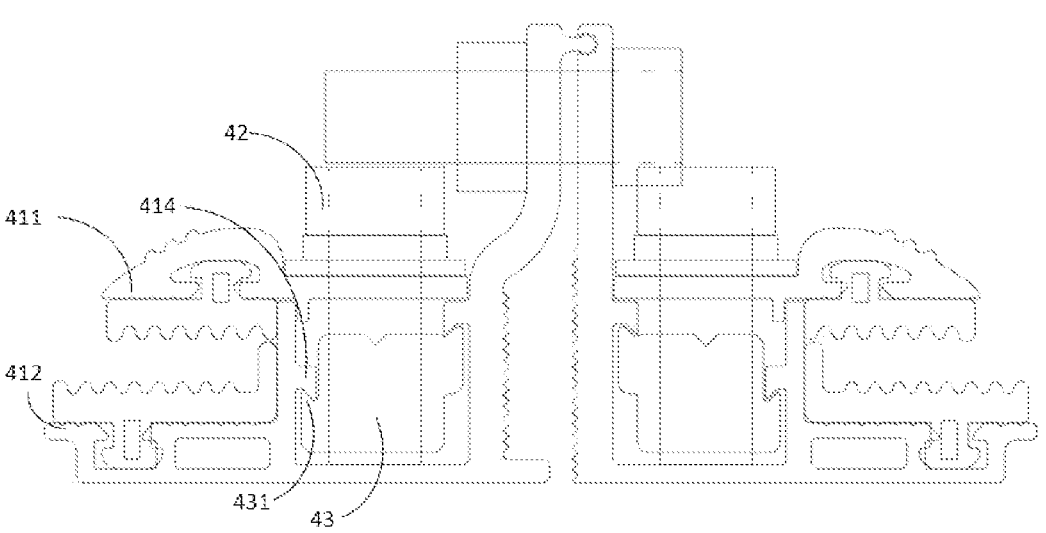
FIG. 6

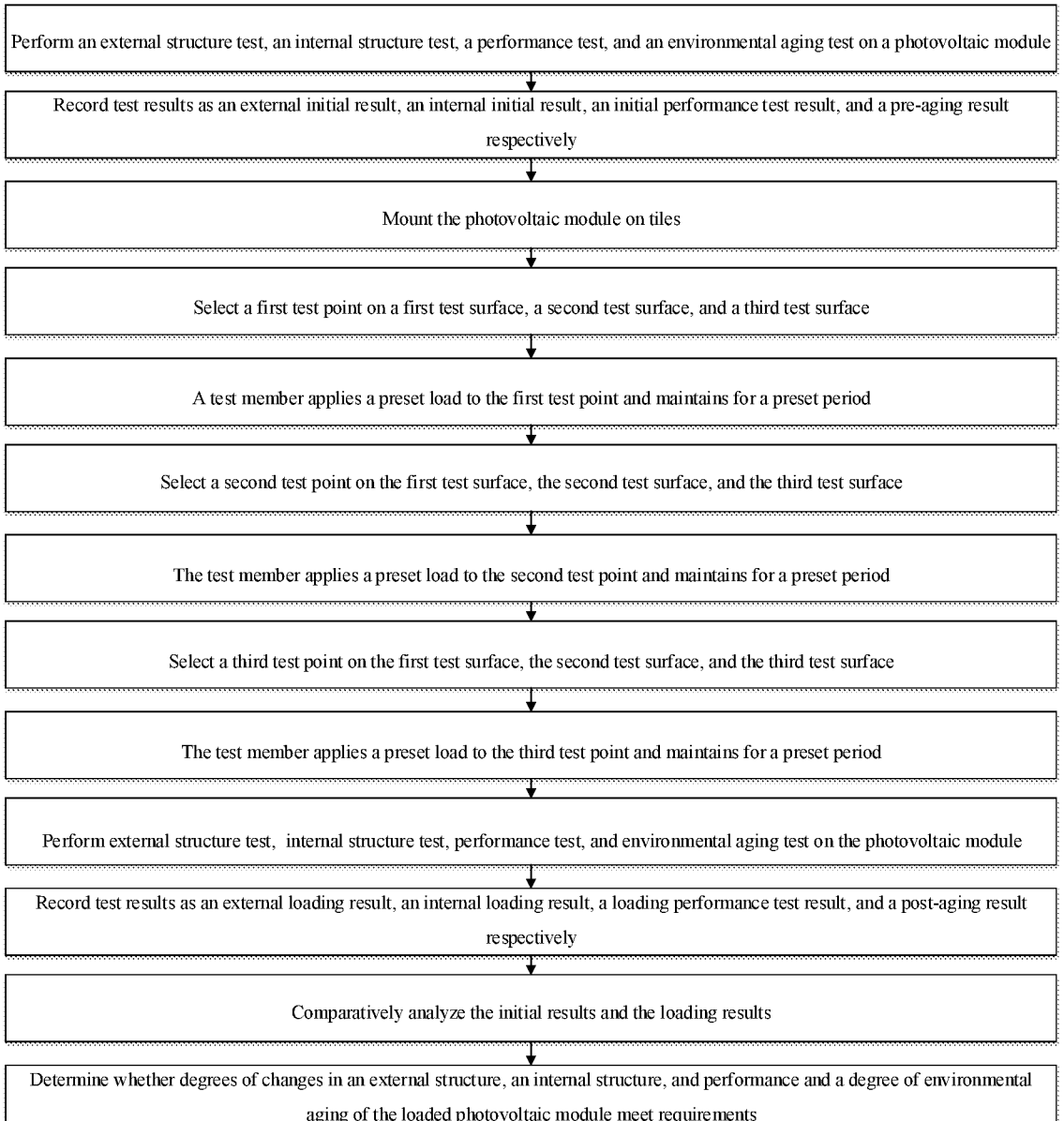

Perform an external structure test, an internal structure test, a performance test, and an environmental aging test on a photovoltaic module Record test results as an external initial result, an internal initial result, an initial performance test result, and a pre-aging result respectively Mount the photovoltaic module on tiles Select a first test point on a first test surface, a second test surface, and a third test surface A test member applies a preset load to the first test point and maintains for a preset period Select a second test point on the first test surface, the second test surface, and the third test surface The test member applies a preset load to the second test point and maintains for a preset period Select a third test point on the first test surface, the second test surface, and the third test surface The test member applies a preset load to the third test point and maintains for a preset period Perform external structure test, internal structure test, performance test, and environmental aging test on the photovoltaic module Record test results as an external loading result, an internal loading result, a loading performance test result, and a post-aging result respectively Comparatively analyze the initial results and the loading results Determine whether degrees of changes in an external structure, an internal structure, and performance and a degree of environmental aging of the loaded photovoltaic module meet requirements

FIG. 12

TESTING DEVICE AND METHOD FOR TESTING PHOTOVOLTAIC MODULE

CROSS-REFERENCE TO RELATED APPLICATIONS

The present application claims priority to Chinese Patent Application No. 202211599370.2, filed on Dec. 12, 2022, to Chinese Patent Application No. 202223341463.3, filed on Dec. 12, 2022, to Chinese Patent Application No. 202223361702.1, filed on Dec. 12, 2022, and to Chinese Patent Application No. 202211610645.8, filed on Dec. 12, 2022, the contents of which are incorporated herein by reference in their entireties.

FIELD

The present disclosure relates to the technical field of photovoltaic modules, and in particular, to a test device and a method for testing a photovoltaic module.

BACKGROUND

The statements in this section merely provide background information related to the present disclosure and may not constitute prior art.

A photovoltaic assembly includes a color steel tile assembly and a photovoltaic module mounted on the color steel tile assembly. During the mounting of the photovoltaic module, an operator needs to step on the photovoltaic module for easy operation. However, during the stepping process, corners of the photovoltaic module and unsupported portions after the photovoltaic module is connected to color steel tiles are prone to risks of hidden cracks and fractures.

Therefore, after machining and manufacturing of the photovoltaic module, there is a need to determine whether anti-stepping performance of the photovoltaic module is as required, so as to adjust parameters such as material, structure, and manufacturing process of the photovoltaic module.

SUMMARY

This section provides a general summary of the disclosure and is not a comprehensive disclosure of its full scope or all of its features.

The present disclosure provides a test device and a method for testing a photovoltaic module, which can test anti-stepping performance of the photovoltaic module.

In a first aspect of the present disclosure, a test device is provided for testing anti-stepping performance of a photovoltaic module, the test device includes a test member configured to abut against the photovoltaic module and apply a preset load to the photovoltaic module. The test member is provided with an abutment surface for abutting against the photovoltaic module, and an area S of the abutment surface satisfies: $50 \text{ cm}^2 \leq S \leq 400 \text{ cm}^2$.

In the present disclosure, the preset load is applied to the photovoltaic module through the test member to simulate force on the photovoltaic module when an operator walks on the surface of the photovoltaic module, so as to easily adjust and replace the material and the manufacturing process of the photovoltaic module according to test results, so that the photovoltaic module has stronger anti-stepping performance, prolonging the service life of the photovoltaic module. $50 \text{ cm}^2 \leq S \leq 400 \text{ cm}^2$ improves accuracy and reliability of the test results of the test device, thereby improving operation performance of the test device.

In some embodiments, along a length direction or a width direction of the photovoltaic module, a length of the abutment surface ranges from 100 mm to 400 mm.

In some embodiments, a contour of the abutment surface is similar to a contour of a shoe sole; or the contour of the abutment surface is one or more of a circle, a rectangle, and an oval.

In some embodiments, the abutment surface includes at least a first abutment surface and a second abutment surface, and the test member includes a first test body and a second test body arranged opposite to each other along a first direction, the first abutment surface is located on the first test body, and the second abutment surface is located on the second test body. The first direction is the length direction or the width direction of the photovoltaic module, and along the first direction, a distance L1 between a geometric center of the first abutment surface and a geometric center of the second abutment surface satisfies: $100 \text{ mm} \leq L1 \leq 500 \text{ mm}$.

In some embodiments, a weight W of the test member satisfies: $50 \text{ KG} \leq W1 \leq 160 \text{ KG}$.

In a second aspect of the present disclosure, a method for testing a photovoltaic module is provided, the method includes: performing a defect inspection test on the photovoltaic module, and recording a test result as an initial result; mounting the photovoltaic module on a color steel tile assembly; applying a preset load to the photovoltaic module by using a test device and maintaining for a preset period; performing the defect inspection test on the loaded photovoltaic module, and recording a test result as a loading result; and comparatively analyzing the initial result and the loading result.

In the present disclosure, the test device applies the preset load to the photovoltaic module and maintains the application for the preset period, to be capable of simulating the operator's standing on the surface of the photovoltaic module, and performs the defect inspection test on the loaded photovoltaic module and comparatively analyzes the initial result and the loading result, to determine whether the structure of the loaded photovoltaic module meets the normal operation requirement of the photovoltaic module, thereby determining whether the operator's standing on the surface of the photovoltaic module may affect the normal operation of the photovoltaic module and realizing judgment of the anti-stepping performance of the photovoltaic module, so as to facilitate subsequent adjustment of parameters such as the structure, the material, and the manufacturing process of the photovoltaic module.

In some embodiments, the photovoltaic module includes a connecting portion and a suspended portion, the connecting portion is configured to contact the color steel tile assembly, the suspended portion is configured to define a cavity with the color steel tile assembly. The photovoltaic module is provided with a first test surface, a second test surface, and a third test surface, the first test surface is located at an edge of the connecting portion, the second test surface is located at the suspended portion, and the third test surface is located at a corner of the photovoltaic module. The applying a preset load to the photovoltaic module by using a test device and maintaining for a preset period includes: applying the preset load to at least one of the first test surface, the second test surface, and the third test surface by using the test device and maintaining for a preset period.

In some embodiments, the applying the preset load to at least one of the first test surface, the second test surface, and the third test surface by using the test device and maintaining for a preset period includes: selecting a first test point on the first test surface, the second test surface, or the third test surface; and applying the preset load to the first test point by using the test device and maintaining for a preset period.

In some embodiments, subsequent to the applying the preset load to the first test point by using the test device and maintaining for a preset period, the method further includes: selecting a second test point on the first test surface, the second test surface, or the third test surface, the first test point and the second test point being distributed along a length direction and/or a width direction of the photovoltaic module; and applying the preset load to the second test point by using the test device and maintaining for a preset period.

In some embodiments, the first test point and the second test point are located on a same one of the first test surface, the second test surface, and the third test surface; or the first test point and the second test point are located on two of the first test surface, the second test surface, and the third test surface, respectively.

In some embodiments, the photovoltaic module is further provided with a fourth test surface, the fourth test surface is a surface other than the first test surface, the second test surface, and the third test surface. The applying a preset load to the photovoltaic module by using a test device and maintaining for a preset period includes: applying the preset load to the fourth test surface by using the test device and maintaining for a preset period.

In some embodiments, the test device includes a test member configured to apply a preset load to the photovoltaic module connected to the test member, the drive assembly is capable of driving the test member to move along the length direction, the width direction, and a thickness direction of the photovoltaic module. The applying a preset load to the photovoltaic module by using a test device and maintaining for a preset period includes: driving, by the drive assembly, the test member to move along the length direction and/or the width direction of the photovoltaic module, so that the test member is located above the first test point in the thickness direction of the photovoltaic module; driving, by the drive assembly, the test member to move along the thickness direction of the photovoltaic module, and applying, by the test member, the preset load to the first test point and maintaining for a preset period; driving, by the drive assembly, the test member to move along the length direction and/or the width direction of the photovoltaic module, so that the test member is located above the second test point in the thickness direction of the photovoltaic module; and driving, by the drive assembly, the test member to move along the thickness direction of the photovoltaic module, and applying, by the test member, the preset load to the second test point and maintaining for a preset period.

In some embodiments, the defect inspection test includes appearance inspection. The performing a defect inspection test on the photovoltaic module, and recording a test result as an initial result includes: inspecting an appearance of the photovoltaic module, and recording an inspection result as an appearance initial result. The performing the defect inspection test on the loaded photovoltaic module, and recording a test result as a loading result includes: inspecting an appearance of the loaded photovoltaic module, and recording an inspection result as an appearance loading result. The comparatively analyzing the initial result and the loading result includes: comparatively analyzing the appearance initial result and the appearance loading result, and determining a degree of change in the appearance of the loaded photovoltaic module. The appearance inspection includes external defect inspection and/or an internal defect test.

In some embodiments, the defect inspection test includes a performance test. The performing a defect inspection test on the photovoltaic module, and recording a test result as an initial result includes: testing performance of the photovoltaic module, and recording a test result as an initial performance test result. The performing the defect inspection test on the loaded photovoltaic module, and recording a test result as a loading result includes: testing performance of the loaded photovoltaic module, and recording a test result as a loading performance test result; and comparatively analyzing the initial performance test result and the loading performance test result, and determining a degree of change in the performance of the loaded photovoltaic module.

In some embodiments, the defect inspection test includes an environmental aging test. The performing a defect inspection test on the photovoltaic module, and recording a test result as an initial result includes: performing the environmental aging test on the photovoltaic module, and recording a test result as a pre-aging result. The performing the defect inspection test on the loaded photovoltaic module, and recording a test result as a loading result includes: performing the environmental aging test on the loaded photovoltaic module, and recording a test result as a post-aging result. The comparatively analyzing the initial result and the loading result includes: comparatively analyzing the pre-aging result and the post-aging result, and determining a degree of environmental aging of the loaded photovoltaic module.

In some embodiments, subsequent to the applying a preset load to the photovoltaic module by using a test device and maintaining for a preset period, the method further includes: performing an International Electrotechnical Commission (IEC) 61215-2 module qualification test (MQT) 20 test on the photovoltaic module.

In some embodiments, the preset period T satisfies: 20 min≤T.

In some embodiments, the color steel tile assembly includes a plurality of color steel tiles and a clamp, the color steel tiles each include a male rib and a female rib arranged opposite to each other along its own width direction, the male rib is fixedly connected to the female rib of the adjacent color steel tile, and the male rib and the female rib are each provided with a bending portion. The photovoltaic module is mounted on the color steel tile through the clamp, and a part of the photovoltaic module connected to the clamp is the connecting portion. Along the thickness direction of the photovoltaic module, a preset distance exists between the photovoltaic module and the bending portion, the photovoltaic module is capable of abutting against the bending portion when the photovoltaic module is under pressure along its own thickness direction, and a part of the photovoltaic module abutting against the bending portion is the connecting portion.

In some embodiments, the bending portion includes a first bending portion extending along a width direction of the color steel tile, along the thickness direction of the photovoltaic module, a preset distance exists between the photovoltaic module and the first bending portion, and when the photovoltaic module is under pressure, the photovoltaic module is capable of abutting against the first bending portion. Along the thickness direction of the photovoltaic module, a distance L1 between the photovoltaic module and the first bending portion satisfies: 5 mm≤L1≤20 mm.

In some embodiments, along the width direction of the color steel tile, lengths of the male rib and the female rib are both L2, a length L3 of the first bending portion is L3, and L2 and L3 satisfy: $1:5 \leq L3:L2 \leq 4:5$.

In some embodiments, the color steel tile further includes a bottom plate, and the male rib and the female rib are arranged on two sides of the bottom plate. The bottom plate is provided with a crimping portion, along the width direction of the color steel tile, the crimping portion is located between the male rib and the female rib, and along the thickness direction of the photovoltaic module, the crimping portion protrudes toward a direction close to the photovoltaic module. A height of the first bending portion is H1, a height of the crimping portion is H2, and H1 and H2 satisfy: $0 \leq H2-H1 \leq 12$ mm.

In some embodiments, the male rib is connected to the female rib of the adjacent color steel tile to form an overlocking, one end of the clamp is connected to the overlocking, and the other end of the clamp is connected to the photovoltaic module. The clamp includes a clamping assembly, the clamping assembly includes a first clamping piece and a second clamping piece arranged opposite to each other along the thickness direction of the photovoltaic module, and the clamp clamps and secures the photovoltaic module through the first clamping piece and the second clamping piece. Along the thickness direction of the photovoltaic module, the second clamping piece is located between the first clamping piece and the bending portion, and a minimum distance L4 between the second clamping piece and the bending portion satisfies: $0 \leq L4 \leq 6$ mm.

It should be understood that the general description above and the detailed description in the following are merely exemplary and illustrative, and cannot limit the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a schematic structural diagram showing connection of a clamp in FIG. 4 according to one or more embodiments of the present disclosure;

FIG. 6 is a schematic structural diagram of a connection structure of the clamp in FIG. 4 according to some other embodiments of the present disclosure;

FIG. 12 is a flowchart of the method for testing a photovoltaic module in FIG. 11 according to one or more embodiments of the present disclosure;

Figure 1:
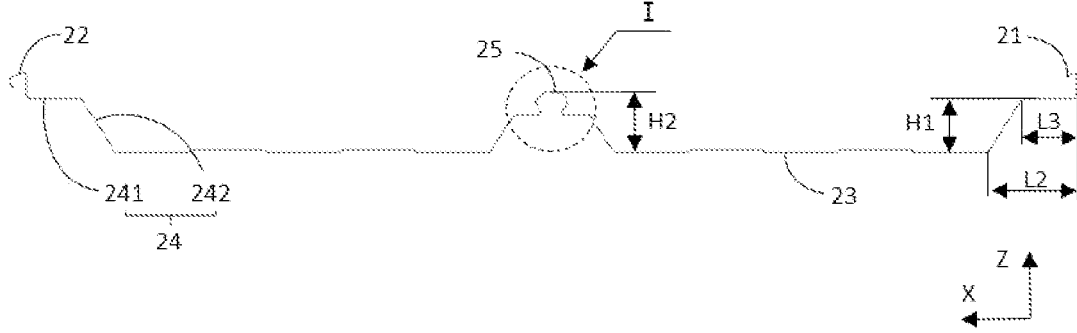
FIG. 1 is a schematic structural diagram showing connection of a color steel tile according to one or more embodiments of the present disclosure.

The accompanying drawings herein, which are incorporated in and constitute a part of this specification, illustrate embodiments consistent with the present disclosure and, together with the specification, serve to explain principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to better understand the technical solution of the present disclosure, embodiments of the present disclosure are described in detail below with reference to the accompanying drawings.

It should be made clear that the embodiments described are only some rather than all of the embodiments of the present disclosure. All other embodiments acquired by those of ordinary skill in the art without creative efforts based on the embodiments of the present disclosure fall within the protection scope of the present disclosure.

The terms used in the embodiments of the present disclosure are intended solely to describe particular embodiments and are not intended to limit the present disclosure. As used in the specification of the present disclosure and the appended claims, the singular forms of "a/an", "the", and "said" are intended to include plural forms, unless otherwise clearly specified in the context.

It should be understood that the term "and/or" used herein only describes an association relationship between associated objects and represents that three relationships may exist. For example, A and/or B may represent the following three cases: only A exists, both A and B exist, and only B exists. In addition, the character "/" herein generally means that associated objects before and after it are in an "or" relationship.

It is to be noted that positional terms such as "above", "below", "left", and "right" described in the embodiments of the present disclosure are described from the perspective shown in the drawings and should not be construed as limiting the embodiments of the present disclosure. In addition, in the context, it should be further understood that, when an element is referred to as "above" or "below" another element, it can be directly connected "above" or "below" another element, and can also be indirectly connected "above" or "below" another element through an intermediate element.

Some embodiments of the present disclosure provide a photovoltaic assembly. In one or more embodiments, the photovoltaic assembly includes a photovoltaic module 1 and a mounting bracket (not labelled in the figure). The photovoltaic module 1 is directly mounted on the ground or on a building main body through the mounting bracket, so as to use solar power to meet daily use requirements. The building main body includes, but is not limited to, roofs and walls of buildings such as workshops and warehouses of production enterprises.

In other embodiments, as shown in FIG. 1 to FIG. 4, the photovoltaic assembly includes a plurality of color steel tile 2 assemblies and a photovoltaic module 1 connected to the color steel tile 2 assemblies. The color steel tile 2 assemblies each include color steel tiles 2 and a support 5. The color steel tiles 2 are mounted on the ground or on a building main body through the support 5, so as to use solar power to generate electricity for daily use.

Figure 3:
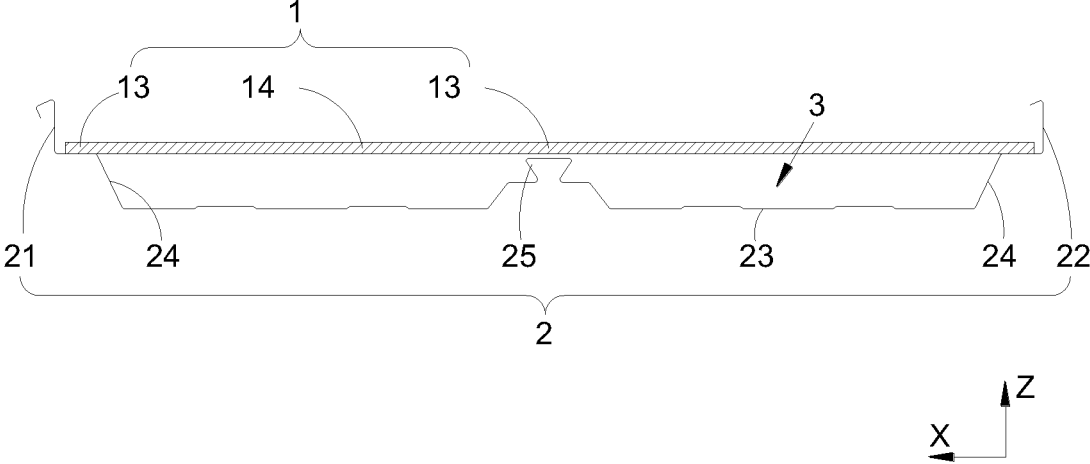
FIG. 3 is a schematic structural diagram of a connection structure of a photovoltaic assembly according to one or more embodiments of the present disclosure.
Figure 4:
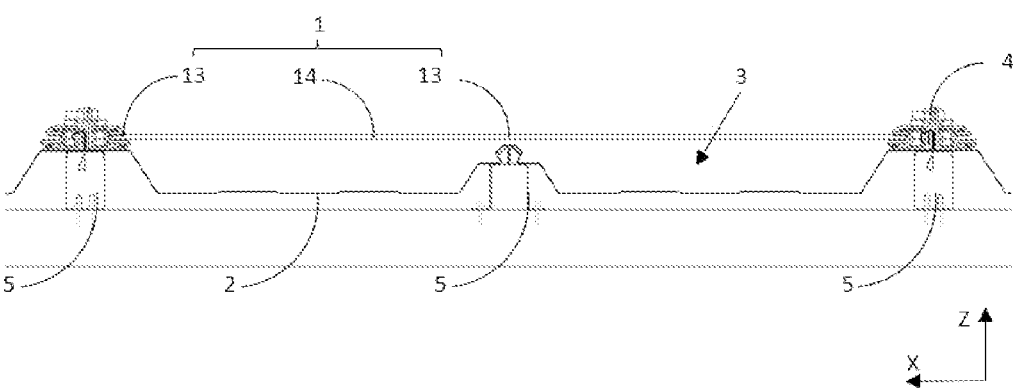
FIG. 4 is a schematic structural diagram showing connection of the photovoltaic assembly according to some other embodiments of the present disclosure.

As shown in FIG. 3 and FIG. 4, the photovoltaic assembly has a first direction X, a second direction Z, and a third direction Y perpendicular to one another. The first direction X is a width direction of the color steel tile 2, the second direction Z is a thickness direction of the color steel tile 2, and the third direction Y is a length direction of the color steel tile 2.

A specific structure of the color steel tile 2 is shown in FIG. 1. The color steel tile 2 includes a bottom plate 23, and a male rib 21 and a female rib 22 arranged opposite to each other on two sides of the bottom plate 23 along the first direction X. The male rib 21 is fixedly connected to the female rib 22 of the adjacent color steel tile 2 to form a lock seam. The male rib 21 and the female rib 22 are each provided with a bending portion 24 for connection with the bottom plate 23. The bottom plate 23 is provided with a crimping portion 25 protruding upwards along the second direction Z. Along the first direction X, the crimping portion 25 is located between the male rib 21 and the female rib 22. The bottom plate 23 is provided with reinforcing ribs (not labelled in the figures) protruding upwards along the second direction Z. When a photovoltaic assembly is used in a strong wind environment, air flows through an upper surface of the color steel tile 2, which reduces pressure of the upper surface of the color steel tile 2, so that a pressure difference exists between an upper surface and a lower surface of the bottom plate 23. In this case, the crimping portion 25, the reinforcing ribs, and the bottom plate 23 near the reinforcing ribs may locally deform under the pressure difference to reduce risks of damages to the color steel tile 2 and failure of connection between adjacent color steel tiles 2, thereby prolonging the service life of the color steel tile 2 and improving stability of connection between the adjacent color steel tiles 2 and between the color steel tiles 2 and the roof.

When the adjacent color steel tiles 2 are fixedly connected, the female rib 22 is lapped on the adjacent male rib 21, and the female rib 22 is fixedly connected to the male rib 21 on the adjacent color steel tile 2 by overlocking through an overlocking tool (not labelled in the figure), so as to simplify the connection structure of the adjacent color steel tiles 2, thereby reducing the space required for mounting the color steel tiles 2. An angle $\alpha$ of the overlocking satisfies: $360° \leq \alpha \leq 540°$. For example, the angle of the overlocking may be $400°$, $450°$, or $500°$.

In one or more embodiments, the angle of the overlocking is a bending angle between the male rib 21 and the female rib 22. If the angle of the overlocking is smaller (i.e., $\alpha < 360°$), the male rib 21 and the female rib 22 have poor overlocking strength, and the male rib 21 and the female rib 22 are easily separated under external force, resulting in failure of the connection between the adjacent color steel tiles 2. If the angle of the overlocking is larger (i.e., $\alpha > 540°$), difficulty of the overlocking is increased, which increases the time spent in fixing the adjacent color steel tiles 2. Therefore, $360° \leq \alpha \leq 540°$ can increase strength of the connection between the male rib 21 and the female rib 22, thereby improving stability of the connection between the adjacent color steel tiles 2, and at the same time, reduce mounting difficulty of the color steel tiles 2 and reduce a mounting cycle of the color steel tiles 2.

In some embodiments, the angle $\alpha$ of the overlocking satisfies: $\alpha = 360°$.

It is defined that the angle of the overlocking is $360°$, which can simplify the overlocking difficulty while improving the stability of the connection between the adjacent color steel tiles 2, thereby further reducing the mounting cycle of the color steel tiles 2.

In addition, the color steel tile assembly further includes a protective film. The protective film covers a surface of the color steel tile 2 to prolong the service life of the color steel tile 2.

As shown in FIG. 3 and FIG. 4, the photovoltaic module 1 includes a connecting portion 13 and an unsupported portion 14. The connecting portion 13 is configured to contact the color steel tile assembly, and the unsupported portion 14 is configured to define a cavity 3 with the color steel tile 2. The connecting portion 13 includes a first connecting portion (not labelled in the figure) and a second connecting portion (not labelled in the figure). The first connecting portion is configured to be fixedly connected to the color steel tile 2 assembly. The second connecting portion is configured to abut against the color steel tiles 2.

Figure 7:
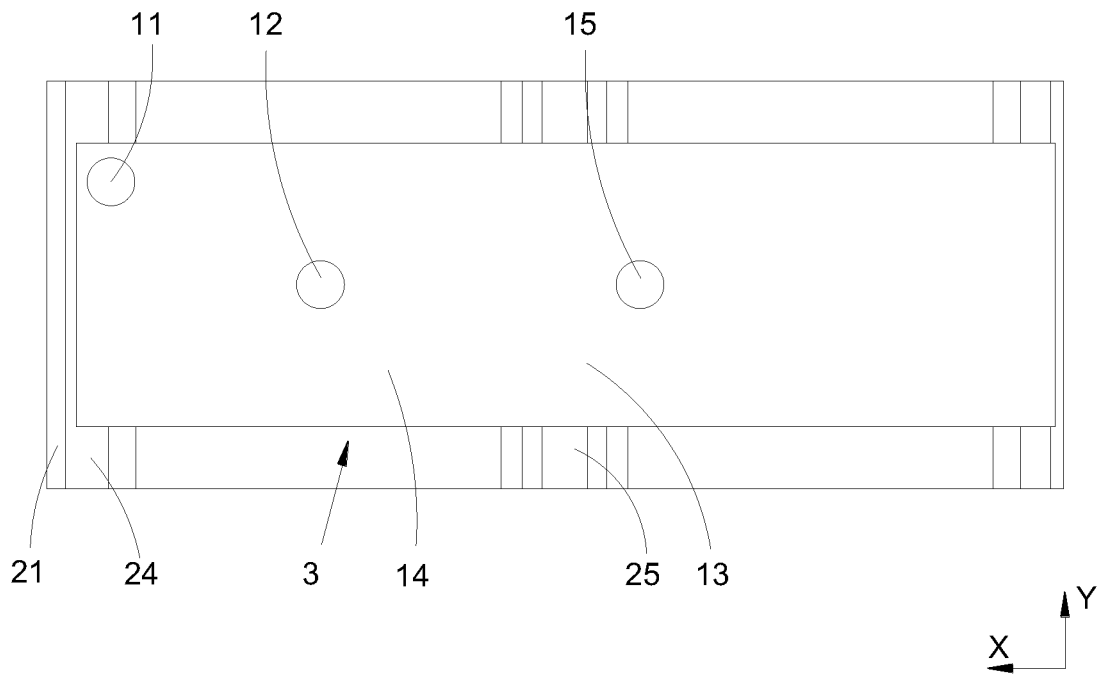
FIG. 7 is a top view of FIG. 3.
Figure 8:
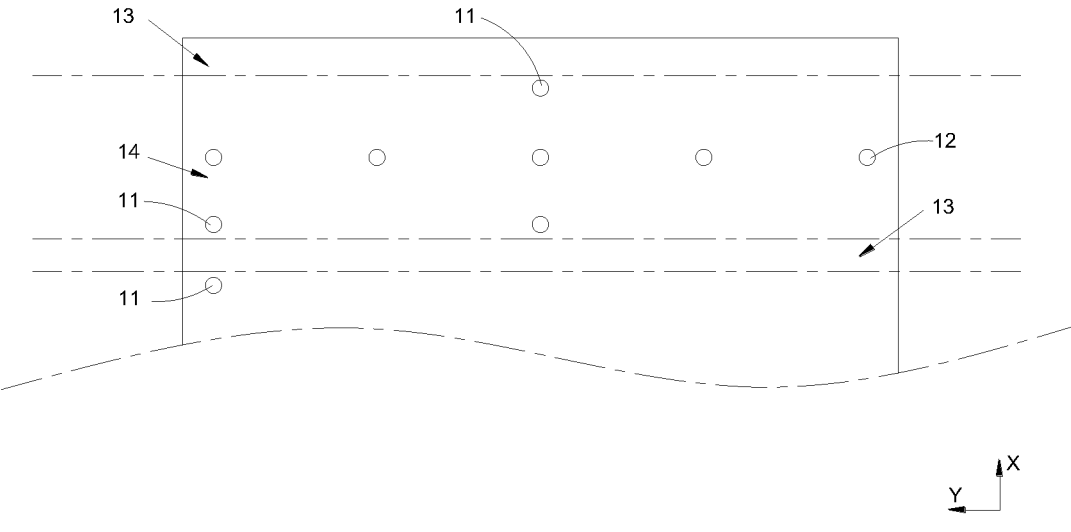
FIG. 8 is a schematic diagram of positions of test points on a photovoltaic module in FIG. 7 according to one or more embodiments of the present disclosure.

In one or more embodiments, as shown in FIGS. 3, 7 and 8, along the first direction X, two sides of the photovoltaic module 1 are respectively bonded to the bending portions 24 on the male rib 21 and the female rib 22 to simplify the way in which the photovoltaic module 1 is connected to the color steel tile 2. In this case, a part of the photovoltaic module 1 for bonding to the bending portion 24 is the first connecting portion.

In other embodiments, as shown in FIG. 4, the color steel tile 2 assembly further includes a clamp 4. Along the first direction X, two ends of the photovoltaic module 1 are respectively connected to the clamp 4. That is, the photovoltaic module 1 is fixed to the color steel tile 2 through the clamp 4. In this case, a part of the photovoltaic module 1 for connection with the clamp 4 is the first connecting portion.

After the photovoltaic module 1 is mounted on the color steel tile 2 through the clamp 4, along the second direction Z, a preset distance exists between the photovoltaic module 1 and the bending portion 24, so that the photovoltaic module 1 can abut against the bending portion 24 when the photovoltaic module 1 locally deforms under the pressure in the second direction Z. In this case, the bending portion 24 can support the photovoltaic module 1, which reduces the risk of damages to the photovoltaic module 1 due to great local deformation. That is, risks of damages to the photovoltaic module 1 due to the stepping during the mounting of the photovoltaic assembly is reduced, the service life of the photovoltaic module 1 is prolonged, and stability of operation of the photovoltaic module 1 is improved, thereby improving anti-stepping performance of the photovoltaic assembly.

In some embodiments, as shown in FIG. 1, the bending portion 24 includes a first bending portion 241 and a second bending portion 242. One end of the second bending portion 242 is connected to the first bending portion 241, and the other end of the second bending portion 242 is connected to the bottom plate 23. The first bending portion 241 extends along the first direction X. Along the second direction Z, a preset distance exists between the photovoltaic module 1 and the first bending portion 241. When the photovoltaic module 1 is under pressure, the photovoltaic module 1 can abut against the first bending portion 241.

In one or more embodiments, when under pressure, the photovoltaic module 1 can abut against the first bending portion 241 extending along the first direction X, so that an abutment surface between the photovoltaic module 1 and the bending portion 24 is a plane extending along the first direction X, which reduces the risk of damages to the photovoltaic module 1 caused by the bending portion 24 due to abutment of the photovoltaic module 1 against a corner of the bending portion 24 and, at the same time, helps to increase the contact area between the photovoltaic module 1 and the bending portion 24, and reduces the risk of insufficient support due to a small contact area between the photovoltaic module 1 and the bending portion 24, thereby improving reliability of support of the bending portion 24 for the photovoltaic module 1.

When the photovoltaic module 1 is not subjected to external force in the second direction Z, a distance L1 between the photovoltaic module 1 and the first bending portion 241 in the second direction Z satisfies: 5 mm≤L1≤20 mm. For example, the distance between the photovoltaic module 1 and the first bending portion 241 in the second direction Z may be 5 mm, 8 mm, 11 mm, 16 mm, 19 mm, or 20 mm.

In one or more embodiments, if the distance between the photovoltaic module 1 and the first bending portion 241 in the second direction Z is shorter, that is, L1<5 mm, under the influence of factors such as machining errors and mounting errors, there is the risk that the photovoltaic module 1 interferes with the first bending portion 241 to cause instability and even failure of the mounting of the photovoltaic module 1. If the distance between the photovoltaic module 1 and the first bending portion 241 in the second direction Z is longer, that is, L1>20 mm, when the photovoltaic module 1 is under pressure, the photovoltaic module 1 is required to produce large deformation to abut against the first bending portion 241, which increases the risk of damages to the photovoltaic module 1. Therefore, 5 mm≤L1≤20 mm can improve stability of the mounting of the photovoltaic module 1 on the color steel tile 2 and, at the same time, reduce the amount of deformation of the photovoltaic module 1 when under pressure and prolong the service life of the photovoltaic module 1.

The distance L1 between the photovoltaic module 1 and the first bending portion 241 satisfies: 10 mm≤L1≤15 mm. That is, the distance between the photovoltaic module 1 and the first bending portion 241 in the second direction Z may be 10 mm, 11 mm, 13 mm, or 15 mm, which further reduces the influence of factors such as machining errors and mounting errors on the stability of the mounting of the photovoltaic module 1 and further improves the supporting effect of the first bending portion 241 on the photovoltaic module 1.

As shown in FIG. 1, along the first direction X, lengths of the male rib 21 and the female rib 22 are both L2, a length of the first bending portion 241 is L3, and L2 and L3 satisfy:

1:5≤L3:L2≤4:5. For example, a length ratio of the first bending portion 241 to the male rib 21 and the female rib 22 may be 1:5, 2:5, 3:5, or 4:5.

During the machining of the color steel tile 2, the lengths of the male rib 21 and the female rib 22 are constant values. If the length of the first bending portion 241 is to be changed, an inclination angle of the second bending portion 242 is required to be adjusted. If the length of the first bending portion 241 is greater, that is, L3:L2>4:5, an angle between an inclination direction of the second bending portion 242 and the second direction Z is smaller, which increases difficulty of the machining of the second bending portion 242. If the length of the first bending portion 241 is smaller, that is, L3:L2<1:5, a size of the second bending portion 242 for supporting the photovoltaic module 1 is smaller, which reduces reliability of the support of the second bending portion 242 for the photovoltaic module 1. Therefore, in one or more embodiments, 1:5≤L3:L2≤4:5 increases the contact area between the second bending portion 242 and the photovoltaic module 1 while reducing difficulty of the machining of the color steel tile 2, thereby improving the reliability of the support of the second bending portion 242 for the photovoltaic module 1.

In some embodiments, the length ratio of the first bending portion 241 to the male rib 21 and the female rib 22 is 3:5, so as to further improve the reliability of the support of the second bending portion 242 for the photovoltaic module 1.

In addition, the color steel tile 2 is provided with a supporting portion. Along the second direction Z, a distance between the supporting portion and the photovoltaic module 1 ranges from 5 mm to 20 mm. When the photovoltaic module 1 is under pressure in the second direction Z, a local structure of the photovoltaic module 1 deforms and abuts against the supporting portion, and the supporting portion can support the photovoltaic module 1, to reduce the risk of damages to the photovoltaic module 1 due to excessive deformation. In this case, a part of the photovoltaic module 1 for abutting against the supporting portion is the second connecting portion.

In one or more embodiments, the supporting portion is an additional part arranged on the color steel tile 2. That is, the supporting portion is fixedly connected to the color steel tile 2.

In other embodiments, the overlock or the crimping portion 25 of the color steel tile 2 is the supporting portion. As shown in FIG. 1, along the second direction Z, a height of the first bending portion 241 is H1, a height of the crimping portion 25 is H2, and H1 and H2 satisfy: 0≤H2−H1≤12 mm. For example, a height difference between the crimping portion 25 and the first bending portion 241 may be 1 mm, 3 mm, 6 mm, 11 mm, or 12 mm.

In one or more embodiments, along the first direction X, the crimping portion 25 is located between the male rib 21 and the female rib 22. That is, the crimping portion 25 is located between two adjacent first bending portions 241. If the crimping portion 25 is lower than the first bending portions 241, after the photovoltaic module 1 is mounted on the color steel tile 2, the photovoltaic module 1 between the two adjacent first bending portions 241 is in an unsupported state, and the unsupported area of the photovoltaic module 1 is relatively large. When the photovoltaic module 1 is subjected to external force in the second direction Z, the photovoltaic module 1 between the two adjacent first bending portions 241 deforms greatly, thereby increasing the risk of damages to the photovoltaic module 1. If the height difference between the crimping portion 25 and the first bending portion 241 is greater, that is, H2−H1>12 mm, when the photovoltaic module 1 is mounted on the color steel tile 2, a distance between the photovoltaic module 1 and the crimping portion 25 is smaller, and there is a risk that the photovoltaic module 1 interferes with the crimping portion 25 under the influence of factors such as machining errors and mounting errors. That is, there is a risk that the crimping portion 25 lifts up the photovoltaic module 1 along the second direction Z, thereby increasing the risk of damages to the photovoltaic module 1. Therefore, the height difference between the crimping portion 25 and the first bending portion 241 satisfies: 0≤H2–H1≤12 mm, so that the height of the crimping portion 25 is equal to or greater than that of the first bending portion 241, and after the photovoltaic module 1 is mounted on the color steel tile 2, if the photovoltaic module 1 is under pressure in the second direction Z, the crimping portion 25 can abut against the photovoltaic module 1. That is, the crimping portion 25 can support the photovoltaic module 1, which reduces the risk of damages to the photovoltaic module 1 between the two adjacent first bending portions 241, thereby further prolonging the service life of the photovoltaic module 1.

The height of the first bending portion 241 and the height of the crimping portion 25 satisfy: 3 mm<H2–H1≤6 mm, so as to further improve the stability of the support of the crimping portion 25 for the photovoltaic module 1, thereby further prolonging the service life of the photovoltaic module 1. In some embodiments, the height difference between the crimping portion 25 and the first bending portion 241 may be 3 mm, 4.6 mm, 5.5 mm, or 6 mm.

Figure 2:
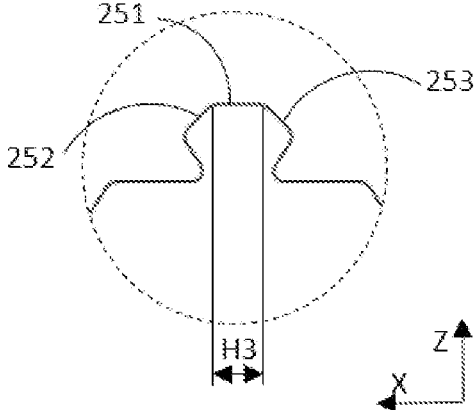
FIG. 2 is an enlarged view of Part I in FIG. 1.

In some embodiments, as shown in FIG. 2, the crimping portion 25 includes a first wall 251 extending along the first direction X, and a width H3 of the first wall 251 satisfies: 10 mm≤H3≤100 mm. For example, the width of the first wall 251 may be 10 mm, 26 mm, 44 mm, 44 mm, 78 mm, 90 mm, or 100 mm.

In one or more embodiments, when the photovoltaic module 1 is subjected to external force in the second direction Z, the first wall 251 of the crimping portion 25 can abut against the photovoltaic module 1 to support the photovoltaic module 1. If the width of the first wall 251 is smaller, that is, H3<10 mm, the contact area between the crimping portion 25 and the photovoltaic module 1 is smaller, and supporting force of the corner portion 25 on the photovoltaic module 1 is less, which increases stress at an edge position where the photovoltaic module 1 abuts against the first wall 251 and thus increases the risk of damages to the photovoltaic module 1. If the width of the first wall 251 is greater, that is, H3>100 mm, machining difficulty of the crimping portion 25 is increased, thereby increasing machining costs of the color steel tile 2. Therefore, 10 mm≤H3≤100 mm can improve reliability of the support of the crimping portion 25 for the photovoltaic module 1 and reduce machining costs of the color steel tile 2.

As shown in FIG. 4 and FIG. 5, the clamp 4 includes a clamping assembly 41, the clamping assembly 41 includes a first clamping piece 411 and a second clamping piece 412 arranged opposite to each other along the second direction Z, and the clamp 4 clamps and secures the photovoltaic module 1 through the first clamping piece 411 and the second clamping piece 412.

In one or more embodiments, the clamp 4 clamps the photovoltaic module 1 through the first clamping piece 411 and the second clamping piece 412, which simplifies the way in which the clamp 4 is connected to the photovoltaic module 1, thereby simplifying the structure of the clamp 4 and reducing manufacturing costs of the clamp 4. At the same time, mounting and disassembly of the photovoltaic module 1 on the clamp 4 are facilitated, and disassembly and assembly processes of the photovoltaic module 1 are simplified, thereby shortening the assembling cycle of the photovoltaic assembly.

Along the first direction X and/or the third direction Y, a plurality of clamps 4 are spaced apart on the two sides of the photovoltaic module 1 to improve stability of the connection between the photovoltaic module 1 and the color steel tile 2. When the photovoltaic module 1 is subjected to external force along the second direction Z, the photovoltaic module 1 can abut against part of the first bending portion 241 between adjacent clamps 4.

In some embodiments, along the second direction Z, the second clamping piece 412 is located between the first clamping piece 411 and the bending portion 24, and a minimum distance L4 between the second clamping piece 412 and the bending portion 24 satisfies: 0≤L4≤6 mm. That is, along the second direction Z, a minimum vertical distance between the second clamping piece 412 and the first bending portion 241 is L4. For example, L4 may be 0 mm, 1 mm, 3.6 mm, 4 mm, or 6 mm.

In one or more embodiments, when L4=0, the second clamping piece 412 abuts against the first bending portion 241. After the photovoltaic module 1 is mounted on the clamp 4, the first bending portion 241 can support the second clamping piece 412, which reduces the risk of deformation of and even damages to the second clamping piece 412 under the action of gravity of the photovoltaic module 1 and the external force along the second direction Z, thereby improving structural strength of the second clamping piece 412 and then prolonging the service life of the second clamping piece 412. When a gap of 0 to 6 mm exists between the second clamping piece 412 and the first bending portion 241, the influence of factors such as machining errors and mounting errors can be reduced, thereby reducing the risk of deformation of and damages to the second clamping piece 412 and the first bending portion 241 caused by interference of the second clamping piece 412 with the first bending portion 241 after the clamp 4 is connected to the lock seam, improving stability of structures of the second clamping piece 412 and the first bending portion 241, and improving reliability of the support of the second clamping piece 412 and the first bending portion 241 for the photovoltaic module 1. If L4>6 mm, the distance between the second clamping piece 412 and the first bending portion 241 is greater, so that a distance between the photovoltaic module 1 and the first bending portion 241 is greater, increasing the risk of damages to the photovoltaic module 1. Therefore, 0≤L4≤6 mm improves the stability of the structures of the second clamping piece 412 and the first bending portion 241, prolongs the service life of the second clamping piece 412 and the first bending portion 241, and improves the reliability of the support of the second clamping piece 412 and the first bending portion 241 for the photovoltaic module 1.

As shown in FIG. 5, the clamp 4 further includes a first regulating member 42, and the first clamping piece 411 and the second clamping piece 412 are detachably connected through the first regulating member 42.

In one or more embodiments, the first clamping piece 411 and the second clamping piece 412 are designed in a split manner. The first clamping piece 411 can move relative to the second clamping piece 412. That is, the first regulating member 42 can regulate a distance between the first clamping piece 411 and the second clamping piece 412. During the mounting of the photovoltaic module 1, the distance between the first clamping piece 411 and the second clamping piece 412 is increased first through the first regulating member 42, so as to facilitate the photovoltaic module 1 to extend between the first clamping piece 411 and the second clamping piece 412. When the photovoltaic module 1 extends to an appropriate position between the first clamping piece 411 and the second clamping piece 412, the distance between the first clamping piece 411 and the second clamping piece 412 is reduced through the first regulating member 42, to realize clamping and fixing of the photovoltaic module 1. The detachable connection between the first clamping piece 411 and the second clamping piece 412 through the first regulating member 42 simplifies the way in which the clamp 4 is connected to the color steel tile 2, which is conducive to shortening the mounting cycle of the photovoltaic module 1, and, at the same time, is conducive to simplifying the structure of the clamp 4 and reducing machining costs of the clamp 4.

The first regulating member 42 includes, but is not limited to, structures such as screws and bolts. A specific structure type of the first regulating member 42 is not limited in the embodiments of the present disclosure.

In addition, as shown in FIG. 5, the first clamping piece 411 and/or the second clamping piece 412 are/is provided with a gasket 415. For example, the first clamping piece 411 and the second clamping piece 412 are each provided with the gasket 415, the first clamping piece 411 and the second clamping piece 412 are connected to the photovoltaic module 1 through the gaskets 415. The gaskets 415 may be rubber members. When the first clamping piece 411 and the second clamping piece 412 clamp the photovoltaic module 1, the gaskets 415 can play a role of buffering and protecting the photovoltaic module 1, reducing the possibility of hard contact between the photovoltaic module 1 and the first clamping piece 411 and between the photovoltaic module 1 and the second clamping piece 412, thereby reducing the possibility of explosion of or other damages to the photovoltaic module 1 and helping to prolong the service life of the photovoltaic module 1.

In some embodiments, as shown in FIG. 4 and FIG. 5, the first clamping piece 411 and the second clamping piece 412 define an accommodating cavity 413. A limit portion 414 is arranged on a side wall of the accommodating cavity 413. The clamp 4 further includes a limit member 43. The limit member 43 is located in the accommodating cavity 413, and the limit member 43 is connected to the first regulating member 42. When the clamping assembly 41 clamps the photovoltaic module 1, the limit member 43 abuts against the limit portion 414.

In one or more embodiments, description is provided based on an example in which the first regulating member 42 is a bolt and the limit member 43 is provided with a threaded hole. When the first regulating member 42 regulates the distance between the first clamping piece 411 and the second clamping piece 412 to clamp the photovoltaic module 1, the limit member 43 can be driven by the first regulating member 42 to move along the second direction Z toward the first clamping piece 411. After the limit member 43 abuts against the limit portion 414, the first clamping piece 411 has one side abutting against the first regulating member 42 and the other side abutting against an extension arm 412a of the second clamping piece 412 extending along the second direction Z. In this case, the first clamping piece 411 is fixed under the actions of the first regulating member 42, the extension arm 412a, the limit member 43, and the limit portion 414. Therefore, the arrangement of the limit member 43 can simplify connection structures among the first clamping piece 411, the second clamping piece 412, and the first regulating member 42, thereby simplifying an overall structure of the clamp 4 and reducing the costs of the clamp 4. The fixing of the first clamping piece 411 and the second clamping piece 412 through the limit member 43 and the first regulating member 42 reduces the risk of failure of the connection between the photovoltaic module 1 and the color steel tile 2 caused by relative movement between the first clamping piece 411 and the second clamping piece 412 during mounting, transportation, and use, thereby improving stability of the clamping of the photovoltaic module 1 by the first clamping piece 411 and the second clamping piece 412.

In one or more embodiments, as shown in FIG. 5, an outer contour of the limit member 43 is in the shape of a circle, a rectangle, a pentagon, or other regular shapes, the limit member 43 includes an upper surface (not labelled in the figure) and a lower surface (not labelled in the figure) arranged opposite to each other along the second direction Z, and the limit portion 414 directly abuts against the upper surface or the low surface, so as to simplify the structure of the limit member 43.

In addition, as shown in FIG. 5, the first clamping piece 411 is provided with a first protruding portion 411a extending along the second direction Z. The first protruding portion 411a can abut against the extension arm 412a to limit movement of the first clamping piece 411 in relative to the second clamping piece 412 along the first direction X, thereby improving reliability of the connection between the first clamping piece 411 and the second clamping piece 412.

In other embodiments, as shown in FIG. 6, the limit member 43 is provided with a protruding limit fit portion 441. The limit fit portion 441 can be snap-fit with the limit portion 414 to improve stability of the connection between the limit member 43 and the limit portion 414.

As shown in FIG. 5, along the first direction X, the clamp 4 includes a first clamping body 44 and a second clamping body 45. The first clamping body 44 and the second clamping body 45 abut against two sides of the lock seam, respectively. The first clamping body 44 is detachably connected to the second clamping body 45.

In one or more embodiments, the clamping of the lock seam through the first clamping body 44 and the second clamping body 45 can reduce the risk of separation of the male rib 21 from the female rib 22 on the adjacent color steel tile 2 under external force, thereby improving stability of the connection between the adjacent color steel tiles 2. The detachable connection between the first clamping body 44 and the second clamping body 45 can facilitate mounting, disassembly, and replacement of the first clamping body 44 and the second clamping body 45, thereby reducing mounting and maintenance costs of the first clamping body 44 and the second clamping body 45.

In some embodiments, as shown in FIG. 5, one end of the first clamping body 44 away from the lock seam is provided with a first extension portion 441 extending along the second direction Z, and one end of the second clamping body 45 away from the lock seam is provided with a second extension portion 451 extending along the thickness direction of the color steel tile 2. The clamp 4 further includes a second regulating member 46. The first extension portion 441 and the second extension portion 451 are detachably connected through the second regulating member 46.

In one or more embodiments, the first extension portion 441 and the second extension portion 451 are detachably connected through the second regulating member 46, so that a distance between the first extension portion 441 and the second extension portion 451 can be regulated through the second regulating member 46, thereby realizing adjustment of a distance between the entire first clamping body 44 and the entire second clamping body 45. During the mounting of the clamp 4, the distance between the first clamping body 44 and the second clamping body 45 is increased first through the second regulating member 46, so as to facilitate the lock seam to extend between the first clamping body 44 and the second clamping body 45. When the lock seam extends to an appropriate position between the first clamping body 44 and the second clamping body 45, the distance between the first clamping body 44 and the second clamping body 45 is reduced through the second regulating member 46, to realize clamping and fixing of the lock seam. The detachable connection between the first clamping body 44 and the second clamping body 45 through the second regulating member 46 simplifies the way in which the clamp 4 is connected to the lock seam, which is conducive to shortening a mounting cycle of the clamp 4 and, at the same time, is conducive to simplifying the structure of the clamp 4 and reducing the machining costs of the clamp 4.

In addition, as shown in FIG. 5, the first extension portion 441 is provided with a snapping portion 443, and the second extension portion 451 is provided with a snap-fit portion 452. The snapping portion 443 can abut against a side wall of the snap-fit portion 452 to limit relative movement of the first clamping body 44 and the second clamping body 45, thereby improving accuracy of the connection position between the first clamping body 44 and the second clamping body 45 and improving reliability of the connection of the first clamping body 44 and the second clamping body 45 with the lock seam.

In one or more embodiments, the clamping assembly 41 is arranged on the first clamping body 44 or the second clamping body 45. That is, one side of the clamp 4 can clamp the photovoltaic module 1. In other embodiments, as shown in FIG. 5 and FIG. 6, the first clamping body 44 and the second clamping body 45 are each provided with the clamping assembly 41. That is, two sides of the clamp 4 can clamp the photovoltaic module 1. In some embodiments of the present disclosure, the first clamping body 44 and the second clamping body 45 are each provided with the clamping assembly 41.

As shown in FIG. 5 and FIG. 6, the second clamping piece 412 is fixedly connected to or integrally formed with the first clamping body 44 and the second clamping body 45. The first clamping body 44 and the second clamping body 45 are each provided with a second protruding portion 442 extending along the first direction X. When the first clamping piece 411 is fixedly connected to the second clamping piece 412, the first clamping piece 411 has one side abutting against the extension arm 412a and the other side abutting against the second protruding portion 442, which reduces the risk of inclination of the first clamping piece 411 during the mounting, transportation, and use, thereby improving stability of the connection between the first clamping piece 411 and the second clamping piece 412.

In any one of the above embodiments, as shown in FIG. 3 and FIG. 4, the support 5 includes a first support 51 and a second support 52. The first support 51 has one end fixedly connected to the male rib 21 and the female rib 22 on the adjacent color steel tile 2 by means of overlocking and the other end fixedly connected to the roof. The second support 52 has one end fixedly connected to the crimping portion 25 and the other end fixedly connected to the roof.

As shown in FIG. 2, along the first direction X, the crimping portion 25 includes a second wall 252 and a third wall 253 arranged opposite to each other on two sides of the first wall 251. Contours of the second wall 252 and the third wall 253 are in shapes of V. A part of the second support 52 extends into the crimping portion 25 and abuts against the second wall 252 and the third wall 253 to realize fixed connection between the second support 52 and the crimping portion 25.

During the mounting of the photovoltaic assembly, an operator needs to walk on the surface of the photovoltaic module 1. In this case, the first connecting portion, the second connecting portion, and the unsupported portion 14 of the photovoltaic module 1 and corners of the photovoltaic module 1 may be subjected to greater stress. Therefore, before the photovoltaic module 1 is put into mass production and use, there is a need to step on the connecting portion 13 and the unsupported portion 14 of the photovoltaic module 1 and the corners of the photovoltaic module 1 for testing, so as to adjust and replace the material and the manufacturing process of the photovoltaic module 1, etc., so that the photovoltaic module 1 has stronger anti-stepping performance, thereby prolonging the service life of the photovoltaic module 1.

Figure 11:
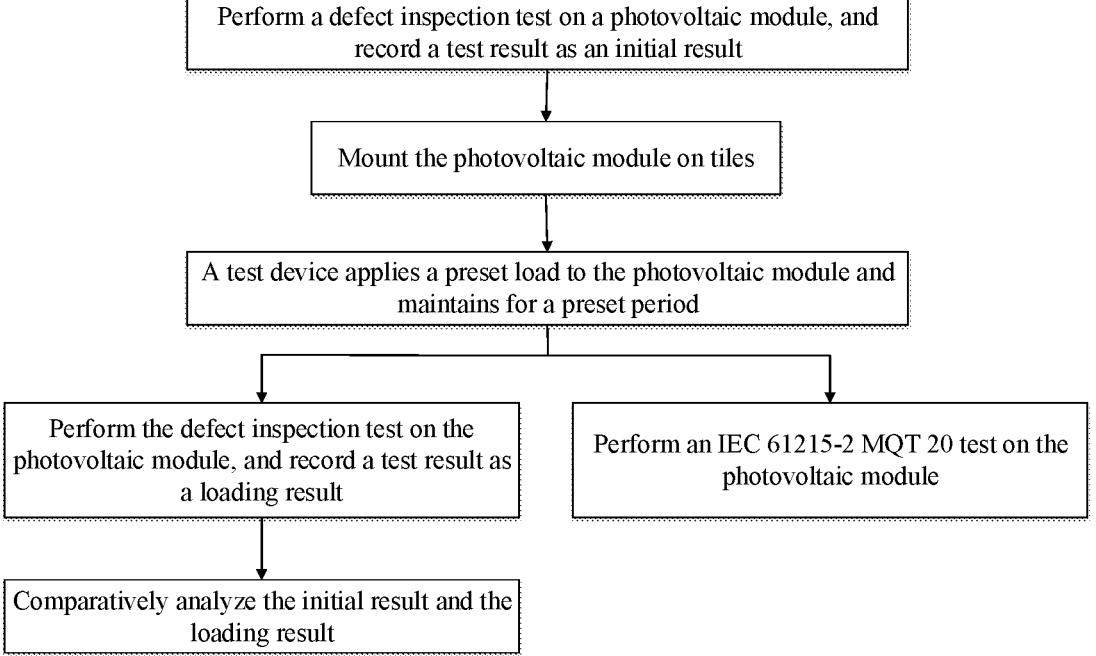
FIG. 11 is a flowchart of a method for testing a photovoltaic module according to one or more embodiments of the present disclosure.

To this end, some embodiments of the present disclosure provide a method for testing a photovoltaic module, which is configured for testing anti-stepping performance of the photovoltaic module 1. As shown in FIG. 11, the test method includes: providing a photovoltaic module 1; performing a defect inspection test on the photovoltaic module 1, and recording a test result as an initial result; mounting the photovoltaic module 1 on a color steel tile assembly; applying a preset load to the photovoltaic module 1 by using the test device 6 and maintaining for a preset period; performing the defect inspection test on the loaded photovoltaic module 1, and recording a test result as a loading result; and comparatively analyzing the initial result and the loading result, and determining degrees of changes in structure and function of the loaded photovoltaic module 1.

In some embodiments of the present disclosure, the test device 6 applies the preset load to the photovoltaic module 1, to be capable of simulating the operator standing on the surface of the photovoltaic module 1, performs the defect inspection test on the loaded photovoltaic module 1 and comparatively analyzes the initial result and the loading result, to be capable of judging whether a structure of the loaded photovoltaic module 1 meets a normal operation requirement of the photovoltaic module 1, thereby determining whether the operator's standing on the surface of the photovoltaic module 1 may affect the normal operation of the photovoltaic module 1 and realizing judgment of the anti-stepping performance of the photovoltaic module 1, so as to facilitate subsequent adjustment of parameters such as the structure, the material, and the manufacturing process of the photovoltaic module 1.

In some embodiments, the photovoltaic module 1 is provided with a first test surface, a second test surface, and a third test surface, the first test surface is located at an edge of the connecting portion 13, the second test surface is located at the unsupported portion 14, and the third test surface is located at a corner of the photovoltaic module 1.

As shown in FIG. 12, the step of applying a preset load to the photovoltaic module 1 and maintaining for a preset period by using the test device 6 includes: applying, by the test member 6, a preset load to at least one of the first test surface, the second test surface, and the third test surface and maintaining for a preset period.

In one or more embodiments, the test device 6 may perform a stepping test on only one of the first test surface, the second test surface, and the third test surface, so as to shorten a test cycle. In other embodiments, the test device 6 may perform a stepping test respectively or simultaneously on at least two of the first test surface, the second test surface, and the third test surface, so as to test anti-stepping performance of an entire surface of the photovoltaic module 1.

As shown in FIG. 12, the step of applying a preset load to the photovoltaic module 1 by using a test device 6 and maintaining for a preset period includes: selecting a first test point 11 on the first test surface, the second test surface, or the third test surface; and applying the preset load to the first test point 11 by using the test device 6 and maintaining for a preset period.

In one or more embodiments, the test device 6 performs the stepping test on the photovoltaic module 1 only at the first test point 11. That is, the test device 6 performs the stepping test on the photovoltaic module 1 only once.

In some other embodiments, the test device 6 performs the stepping test on the photovoltaic module 1 at least twice. As shown in FIG. 12, subsequent to the step of applying the preset load to the first test point 11 by using the test device 6 and maintaining for a preset period, the method further includes: selecting a second test point 12 on the first test surface, the second test surface, or the third test surface, the second test point 12 and the first test point 11 being distributed along the first direction X and/or the third direction Y; and applying the preset load to the second test point 12 by using the test device 6 and maintaining for a preset period.

In one or more embodiments, the first test point 11 and the second test point 12 are located on a same one of the first test surface, the second test surface, and the third test surface. That is, the test device 6 successively performs the stepping test twice on the first test surface, the second test surface, or the third test surface, so as to improve reliability of the test results of the anti-stepping performance at the first test surface, the second test surface, and the third test surface of the photovoltaic module 1.

In some other embodiments, the first test point 11 and the second test point 12 are located on different ones of the first test surface, the second test surface, and the third test surface. That is, the test device 6 successively performs the stepping test on two of the first test surface, the second test surface, or the third test surface. By taking the first test surface and the second test surface as an example, the first test point 11 is located on the first test device, the second test point 12 is located on the second test surface, and the test device 6 successively performs the stepping test on the first test point 11 and the second test point 12, so as to test the anti-stepping performance of different positions on the photovoltaic module 1.

In some embodiments, the test device 6 may perform the stepping test three times, four times, five times, or more on the photovoltaic module 1. In this case, there is a need to select a third test point 15, a fourth test point (not labelled in the figure), a fifth test point (not labelled in the figure), and the like from the first test surface, the second test surface, or the third test surface. A specific number of times of the stepping test, specific numbers of the test points, and distribution positions of the test points are not limited in the present disclosure. For the convenience of description, the following descriptions are all provided based on an example in which the first test point 11 is located on the first test surface, the second test point 12 is located on the second test surface, and the third test point 15 is located on the third test surface. That is, the step of applying a preset load to the photovoltaic module 1 by using a test device 6 and maintaining for a preset period further includes: selecting a first test point 11 on the first test surface; applying the preset load to the first test point 11 by using the test device 6 and maintaining for a preset period; selecting a second test point 12 on the second test surface; applying the preset load to the second test point 12 by using the test device 6 and maintaining for a preset period; selecting a third test point 15 on the third test surface; and applying the preset load to the third test point 15 by using the test device 6 and maintaining for a preset period.

In one or more embodiments, the stepping test is performed on the first test surface, the second test surface, and the third test surface respectively by using the test device 6, which can realize the test on the anti-stepping performance of the entire surface of the photovoltaic module 1.

The photovoltaic module 1 includes a first edge (not labelled in the figure) extending along the first direction X and a second edge (not labelled in the figure) extending along the third direction Y.

As shown in FIG. 7 and FIG. 8, when the two sides of the photovoltaic module 1 are respectively bonded to the bending portions 24 on the male rib 21 and the female rib 22, parts of the photovoltaic module 1 for bonding to the bending portions 24 are connecting portions. In one or more embodiments, the first connecting portion extends along the first direction X, and the first connecting portion is located at the first edge. In this case, a minimum distance between the first test point 11 and the first connecting portion in the third direction Y is less than 340 mm. In other embodiments, the first connecting portion extends along the third direction Y, and the first connecting portion is located at the second edge 27. In this case, a minimum distance between the first test point 11 and the first connecting portion in the first direction X is less than 340 mm.

In one or more embodiments, if the distance between the first test point 11 and the first connecting portion is longer, the first test point 11 deviates from a position where the stress of the first connecting portion is the greatest, thereby reducing accuracy and reliability of the test result of the first connecting portion. Therefore, the minimum distance between the first test point 11 and the first connecting portion is less than 340 mm, which is conducive to improving accuracy and reliability of the test result of the first connecting portion.

In some embodiments, the minimum distance between the first test point 11 and the first connecting portion in the first direction X or the third direction Y is less than or equal to 210 mm, which may be, for example, 60 mm, 80 mm, 90 mm, 108 mm, 166 mm, 200 mm, or 210 mm.

In one or more embodiments, if the minimum distance between the first test point 11 and the first connecting portion in the first direction X or the third direction Y is shorter, during the test on the anti-stepping performance of the first connecting portion by the test device 6 at the first test point 11, a distance between the test device 6 and the first bending portion 241 is shorter, there may be risks of invalid test results, damages to the test device 6, and damages to the first bending portion 241 under the influence of factors such as mounting errors and processing errors. Therefore, the minimum distance between the first test point 11 and the first connecting portion is less than or equal to 210 mm, which can increase the distance between the test device 6 and the first bending portion 241, thereby prolonging the service life of the test device 6 and the color steel tile 2 and improving operation stability of the test device 6 and, at the same time, being conducive to improving the accuracy and reliability of the test results of the first connecting portion.

When the photovoltaic module 1 is fixed to the color steel tile 2 through the clamp 4, a part of the photovoltaic module 1 for connection with the clamp 4 is the first connecting portion. Along the first direction X and/or the third direction Y, a plurality of clamps 4 are spaced apart from one another to improve stability of the connection of the photovoltaic module 1.

Figure 9:
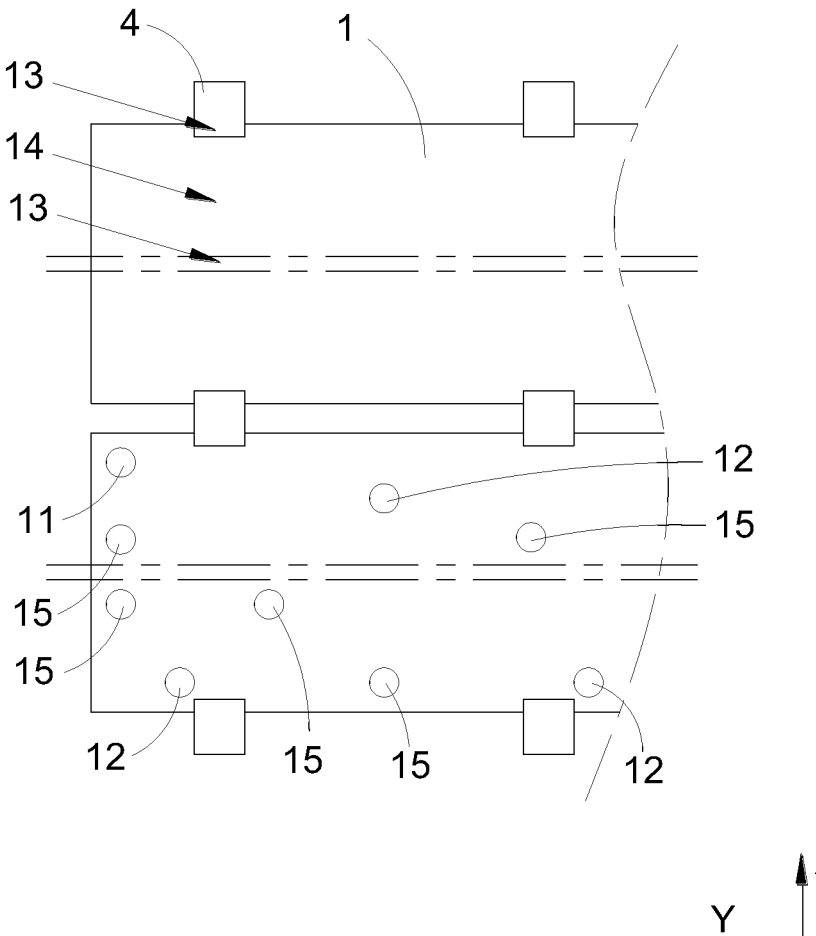
FIG. 9 is a top view of the photovoltaic assembly in FIG. 4 according to one or more embodiments of the present disclosure.
Figure 10:
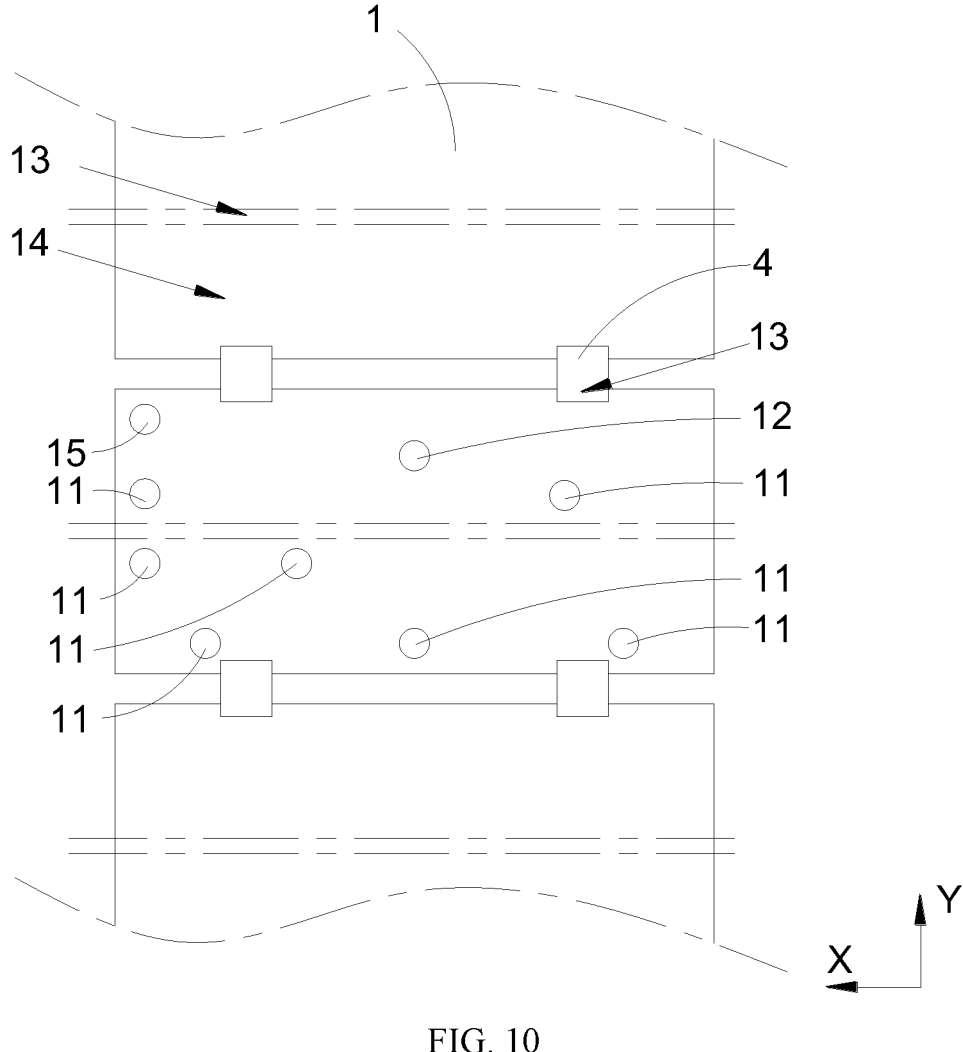
FIG. 10 is a top view of the photovoltaic assembly in FIG. 4 according to some other embodiments of the present disclosure.

As shown in FIG. 9 and FIG. 10, along the first direction X and/or the third direction Y, one or two sides of the clamp 4 is provided with the first test point 11.

In one or more embodiments, the clamp 4 clamps the first connecting portion of the photovoltaic module 1. When the photovoltaic module 1 is subjected to the pressure in the second direction Z, an edge position of the first connecting portion in contact with the clamp 4 is subjected to greater stress, and the first test point 11 is arranged at the edge position of the first connecting portion, which can facilitate the test on anti-stepping performance of the edge position of the first connecting portion in contact with the clamp 4, and thus is conducive to improving the anti-stepping perfor- mance of the first connecting portion.

In one or more embodiments, one side of the clamp 4 is provided with the first test point 11 to shorten the cycle of the test on the anti-stepping performance of the photovoltaic module 1. In other embodiments, along the distribution direction of the clamps 4, two sides of the clamps 4 are each provided with the first test point 11, so as to improve accuracy and reliability of the test on the anti-stepping performance of the first connecting portion.

In addition, one first test point 11 may be arranged between two adjacent clamps 4. In this case, the first test point 11 is located at a midpoint of a line connecting the two clamps 4. In other embodiments, a plurality of first test points 11 may be spaced apart from one another between two adjacent clamps 4, and the first test points 11 between the two adjacent clamps 4 may be uniformly distributed or non-uniformly distributed.

In some embodiments, as shown in FIG. 10, the first connecting portion is located at the first edge. That is, the clamp 4 clamps the first edge of the photovoltaic module 1. A minimum distance between the first test point 11 and the clamp 4 in the first direction X is less than or equal to 210 mm, which may be, for example, 80 mm, 90 mm, 160 mm, 200 mm, or 210 mm. In other embodiments, as shown in FIG. 9, the first connecting portion is located at the second edge. That is, the clamp 4 clamps the second edge of the photovoltaic module 1. A minimum distance between the first test point 11 and the clamp 4 in the third direction Y is less than or equal to 210 mm, which may be, for example, 80 mm, 90 mm, 160 mm, 200 mm, or 210 mm.

In one or more embodiments, if the minimum distance between the first test point 11 and the clamp 4 in the first direction X and/or the third direction Y is greater than 210 mm, the first test point 11 deviates from a position where the stress of the first connecting portion is the greatest, thereby reducing accuracy and reliability of the test result of the first connecting portion. Therefore, the minimum distance between the first test point 11 and the clamp 4 in the first direction X and/or the third direction Y is less than or equal to 210 mm, which is conducive to improving the accuracy and reliability of the test result of the first connecting portion.

The minimum distance between the first test point 11 and the clamp 4 in the first direction X ranges from 90 mm to 210 mm, which may be, for example, 90 mm, 108 mm, 166 mm, 200 mm, or 210 mm. Alternatively, the minimum distance between the first test point 11 and the clamp 4 in the third direction Y ranges from 90 mm to 210 mm, which may be, for example, 90 mm, 108 mm, 166 mm, 200 mm, or 210 mm.

In one or more embodiments, if the minimum distance between the first test point 11 and the clamp 4 in the first direction X and/or the third direction Y is less than 90 mm, during the test on the anti-stepping performance of the first connecting portion by the test device 6 at the first test point 11, the distance between the test device 6 and the clamp 4 is shorter, and under the influence of factors such as mount- ing errors and processing errors, there is a risk that the test device 6 interferes with the clamp 4, thereby increasing risks of invalid test results, damages to the test device 6, and damages to the first bending portion 4. Therefore, the minimum distance between the first test point 11 and the clamp 4 in the first direction X and/or the third direction Y ranges from 90 mm to 210 mm, which can increase the distance between the test device 6 and the clamp 4, thereby prolonging the service life of the test device 6 and the clamp 4 and improving operation stability of the test device 6 and, at the same time, being conducive to improving the accuracy and reliability of the test results of the first connecting portion.

As shown in FIG. 7 to FIG. 10, the second test point 12 is located at the unsupported portion 14. In one or more embodiments, the second test point 12 coincides with a geometric center of the unsupported portion 14. That is, the second test point 12 is located in the middle of the unsup- ported portion 14.

When the photovoltaic module 1 is subjected to pressure in the second direction Z, a distance between a middle position of the unsupported portion 14 and the supporting portion is the greatest, so that deformation of the middle of the unsupported portion 14 of the photovoltaic module 1 is the greatest. Therefore, the arrangement of the second test point 12 at the middle position of the unsupported portion 14 can improve accuracy and reliability of the test on the anti-stepping performance of the unsupported portion 14.

In addition, as shown in FIG. 8 to FIG. 10, a plurality of second test points 12 may be provided. The plurality of second test points 12 are spaced apart from one another along the first direction X and/or the third direction Y.

In one or more embodiments, a plurality of second test points 12 are arranged at the unsupported portion 14. That is, the anti-stepping test is performed on the unsupported portion 14 multiple times by using the test device 6, which can further improve the accuracy and reliability of the test on the anti-stepping performance of the unsupported portion 14.

As shown in FIG. 9 and FIG. 10, the third test point 15 is arranged at the corner. A vertical distance between the third test point 15 and the first edge is less than or equal to 300 mm. A vertical distance between the third test point 15 and the second edge is less than or equal to 300 mm.

If the vertical distance between the third test point 15 and the first edge and the vertical distance between the third test point 15 and the second edge are greater, the third test point 15 deviates from a position where the stress at the corner is the greatest, thereby reducing accuracy and reliability of a test result of the third test point 15. Therefore, the vertical distance between the third test point 15 and the first edge and the vertical distance between the third test point 15 and the second edge are less than or equal to 300 mm, which improves consistency of the pressure applied by the test device 6 to the photovoltaic module 1, and improves the accuracy and reliability of the test result of the third test point 15.

The vertical distance between the third test point 15 and the first edge and the vertical distance between the third test point 15 and the second edge may be the same or different from, so as to increase flexibility of the configuration of the position of the third test point 15.

In addition, in one or more embodiments, one third test point 15 is provided to shorten the test cycle. In other embodiments, a plurality of third test points 15 are provided, and the photovoltaic module 1 has four corners. For the convenience of description, the four corners are respectively recorded as a first corner, a second corner, a third corner, and a fourth corner. At least one of the first corner, the second corner, the third corner, and the fourth corner is provided with at least one third test point 15 to increase the accuracy and reliability of the test result, which, at the same time, is conducive to the test on the anti-stepping performance of the entire surface of the photovoltaic module 1, thereby beneficial to improving the anti-stepping performance of the entire surface of the photovoltaic module 1.

In addition, the photovoltaic module 1 further includes a fourth test surface. The fourth test surface is a surface other than the first test surface, the second test surface, and the third test surface. The fourth test surface is provided with at least one fourth test point (not labelled in the figure). The fourth test point is located on the surface outside the connecting portion 13, the unsupported portion 14, and the corner, so as to perform the anti-stepping test on the entire surface of the photovoltaic module 1.

The step of applying a preset load to the photovoltaic module 1 by using a test device 6 and maintaining for a preset period includes: applying the preset load to the fourth test surface by using the test device 6 and maintaining for a preset period, so as to realize the test on the anti-stepping performance of the entire surface of the photovoltaic module 1.

In some embodiments, the defect inspection of the photovoltaic module 1 includes appearance inspection, so as to determine the degree of damages to an appearance of the loaded photovoltaic module 1, thereby improving reliability of the judgment result of the anti-stepping performance of the photovoltaic module 1.

As shown in FIG. 12, the step of performing a defect inspection test on the photovoltaic module 1, and recording a test result as an initial result includes: performing the appearance inspection on the photovoltaic module 1, and recording a test result as an appearance initial result.

The step of performing the defect inspection test on the loaded photovoltaic module 1, and recording a test result as a loading result includes: performing the appearance inspection on the photovoltaic module 1, and recording a test result as an appearance loading result.

The step of comparatively analyzing the initial result and the loading result, and determining degrees of changes in a structure and a function of the loaded photovoltaic module 1 includes: comparatively analyzing the appearance initial result and the appearance loading result, and determining a degree of change in the appearance of the loaded photovoltaic module 1 according to an appearance change.

The appearance inspection includes external defect inspection and/or an internal defect test, so as to improve accuracy of the test result.

As shown in FIG. 12, the step of performing a defect inspection test on the photovoltaic module 1, and recording a test result as an initial result includes: performing the external defect inspection on the photovoltaic module 1, and recording a test result as an external initial result; and performing the internal defect test on the photovoltaic module 1, and recording a test result as an internal initial result.

The external defect inspection is MQT 01 appearance inspection, and the internal defect test is an electroluminescence (EL) test.

The step of performing the external defect inspection on the photovoltaic module 1, and recording a test result as an external initial result includes: inspecting numbers, positions, and sizes of pits, cracks, damages, etc. on an outer surface of the photovoltaic module 1, and recording an inspection result as the external initial result.

The step of performing the internal defect test on the photovoltaic module 1, and recording a test result as an internal initial result includes: testing internal defects of the photovoltaic module 1 by using an EL tester, and recording numbers, positions, and sizes of internal hidden cracks, debris, and other defects as the internal initial result.

As shown in FIG. 12, the step of performing the defect inspection test on the loaded photovoltaic module 1, and recording a test result as a loading result includes: performing the external defect inspection on the photovoltaic module 1, and recording a test result as an external loading result; and performing the internal defect test on the photovoltaic module 1, and recording a test result as an internal loading result.

The step of performing the external defect inspection on the photovoltaic module 1, and recording a test result as an external loading result includes: inspecting numbers, positions, and sizes of pits, cracks, broken gates, etc. on the outer surface of the photovoltaic module 1, and recording an inspection result as the external loading result.

The step of performing the internal defect test on the photovoltaic module 1, and recording a test result as an internal loading result includes: testing internal defects of the photovoltaic module 1 by using an EL tester, and recording numbers, positions, and sizes of internal hidden cracks, debris, and other defects as the internal loading result.

As shown in FIG. 12, the step of comparatively analyzing the initial result and the loading result, and determining degrees of changes in a structure and a function of the loaded photovoltaic module 1 includes: comparatively analyzing the external initial result and the external loading result, and determining a degree of change in external defects of the loaded photovoltaic module 1 according to changes in a number and a size of defects on the outer surface; comparatively analyzing the internal initial result and the internal loading result, and determining a degree of change in internal defects of the loaded photovoltaic module 1 according to changes in a number and a size of the internal defects; and determining, according to the degrees of changes in the external defects and the internal defects of the loaded photovoltaic module 1, whether the anti-stepping performance of the photovoltaic module 1 meets the production requirement.

In one or more embodiments, during the stepping test on the photovoltaic module 1 by the test device 6, if there are obvious cracks, broken gates, etc. on the outer surface of the photovoltaic module 1, or if an external defect of the loaded photovoltaic module 1 changes greatly, the anti-stepping performance of the photovoltaic module 1 is unqualified, the test is stopped directly, and the stepping test is performed again after adjustment of parameters such as a structure, a process, and a material of the photovoltaic module 1. If the degree of change in the external defects of the loaded photovoltaic module 1 is less, the anti-stepping performance of the photovoltaic module 1 meets the requirement, and the photovoltaic module 1 can be put into production and use.

In addition, the defect inspection test on the photovoltaic module 1 further includes a performance test, the step of performing a defect inspection test on the photovoltaic module 1, and recording a test result as an initial result includes: testing performance of the photovoltaic module 1, and recording a test result as an initial performance test result.

The step of performing the defect inspection test on the loaded photovoltaic module 1, and recording a test result as a loading result includes: testing performance of the loaded photovoltaic module 1, and recording a test result as a loading performance test result.

The step of comparatively analyzing the initial result and the loading result, and determining degrees of changes in a structure and a function of the loaded photovoltaic module 1 includes: comparatively analyzing the initial performance test result and the loading performance test result, and determining, according to a degree of change in the performance, whether the anti-stepping performance of the photovoltaic module 1 meets the production requirement.

The performance test includes, but is not limited to, an MQT 19.1 initial steady-state test, an MQT 06.1 standard test condition (STC) power test, an MQT 03 insulation test, an MQT 15 wet leakage current test, etc. A specific type and a number of the performance test are not limited in the present disclosure.

In addition, the defect inspect test on the photovoltaic module 1 further includes an environmental aging test. The environmental aging test includes, but is not limited to, an MQT 11 thermal cycle test, an MQT 12 humidity-freeze test, and an MQT 13 humidity thermal cycle test. Specific content and a number of the environmental aging test are not limited in the embodiments of the present disclosure.

The step of performing a defect inspection test on the photovoltaic module 1, and recording a test result as an initial result includes: performing the environmental aging test on the photovoltaic module 1, and recording a test result as a pre-aging result.

The step of performing the defect inspection test on the loaded photovoltaic module 1, and recording a test result as a loading result includes: performing the environmental aging test on the loaded photovoltaic module 1, and recording a test result as a post-aging result.

The step of comparatively analyzing the initial result and the loading result, and determining degrees of changes in a structure and a function of the loaded photovoltaic module 1 includes: comparatively analyzing the pre-aging result and the post-aging result, and determining whether a degree of environmental aging of the photovoltaic module 1 meets the production requirement.

When the test device 6 performs a stepping test on the photovoltaic module 1 multiple times, for example, three times, after completion of the third stepping test, the photovoltaic module 1 is required to be subjected to appearance inspection, an operation performance test, and an environmental aging test, and after completion of the first stepping test and the second stepping test, the appearance inspection, the operation performance test, and the environmental aging test may be or not be performed on the photovoltaic module 1, so as to shorten the test cycle.

In addition, subsequent to the step of applying a preset load to the photovoltaic module by using a test device 6 and maintaining for a preset period, the method for testing a photovoltaic module may further include: performing an IEC 61215-2 MQT 20 test on the photovoltaic module 1.

That is, after the photovoltaic module 1 is mounted on a color steel tile assembly, the photovoltaic module 1 is pulled up and down in a second direction Z by using a device, a pull-up and pull-down operation is used as a test cycle, and the photovoltaic module 1 is tested about a thousand times by using the device, to test structural stability of the loaded photovoltaic module 1.

In any one of the above embodiments, the preset load F satisfies: 50 KG≤F≤160 KG. For example, the preset load may be 50 KG, 60 KG, 86 KG, 112 KG, 160 KG, or the like.

When the operator stands on the surface of the photovoltaic module 1 for mounting, there are situations where the operator carries a mounting tool, transports the photovoltaic module 1, etc. If the preset load is less, that is, F<50 KG, the test result is less reliable. If the preset load is greater, that is, F>160 KG, test costs of the photovoltaic module 1 are increased, and manufacturing costs of the photovoltaic module 1 are increased. Therefore, 50 KG≤F≤160 KG can improve reliability of the test result of the photovoltaic module 1 and reduce the test costs of the photovoltaic module 1.

The preset period T satisfies: 20 min≤T. For example, the preset period may be 20 min, 35 min, 42 min, 58 min, 63 min, 70 min, or the like.

When the operator stands on the surface of the photovoltaic module 1 for mounting, the operator needs to be in contact with the photovoltaic module 1 for a long time. If the preset period is shorter, that is, T<20 min, the reliability of the test result is poor. Therefore, 20 min≤T can improve reliability of the test result of the photovoltaic module 1.

In some embodiments, during the test, the preset period is set to 60 min, so as to shorten the test cycle of the photovoltaic module 1.

Figure 13:
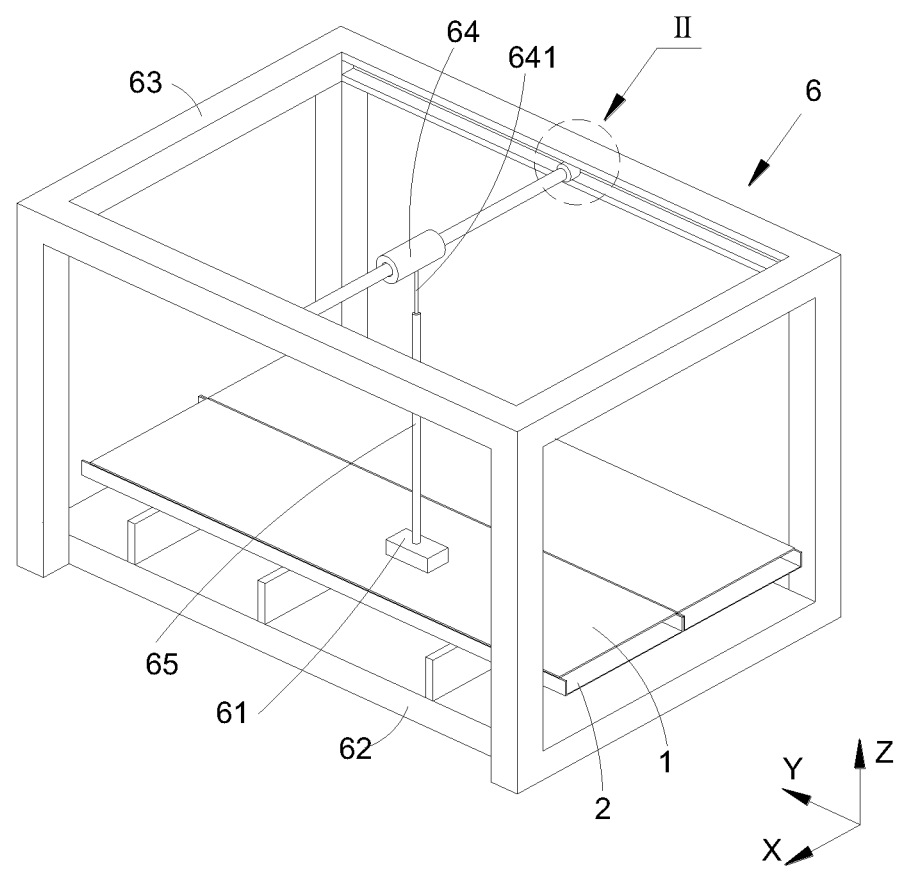
FIG. 13 is a schematic structural diagram of a test member according to one or more embodiments of the present disclosure.

As shown in FIG. 13, the test device 6 includes a test member 61, and the test member 61 is provided with an abutment surface. The test member 61 applies the preset load to the photovoltaic module 1 through the abutment surface. In one or more embodiments, a contour shape of the abutment surface matches that of a shoe sole, so as to improve the accuracy and reliability of the test results. In some embodiments, the contour shape of the abutment surface matches the contour shape of the shoe sole of forefoot and heel portions. In other embodiments, the contour shape of the abutment surface is a circle, a rectangle, a pentagon, or other regular shapes, so as to reduce machining costs of the test member 61.

An area S of the abutment surface satisfies: 50 cm²≤S≤400 cm².

In one or more embodiments, if the area of the abutment surface is smaller, that is, S<50 cm², when the preset load is applied to the photovoltaic module 1, the pressure on the photovoltaic module 1 is greater, which is quite different from the pressure exerted by the operator on the photovoltaic module 1 during the actual mounting, reducing the reliability of the test results. If the area of the abutment surface is larger, that is, S>400 cm², when the preset load is applied to the photovoltaic module 1 through the abutment surface, the pressure on the photovoltaic module 1 is less, which is quite different from the pressure exerted by the operator on the photovoltaic module 1 during the actual mounting, reducing the reliability of the test results. Therefore, 50 cm²≤S≤400 cm² improves the accuracy and reliability of the test results of the photovoltaic module 1.

In one or more embodiments, one abutment surface 611 is provided. That is, the test member 61 is in contact with the photovoltaic module 1 only through one abutment surface

611, thereby simplifying a structure of the test member 61 and reducing manufacturing costs of the test member 61.

In other embodiments, no less than two abutment surfaces 611 are provided, which may be two, three, four, five, or more, so as to improve flexibility of the structure of the test member 61. Two abutment surfaces 611 are provided in the present disclosure.

Figure 14:
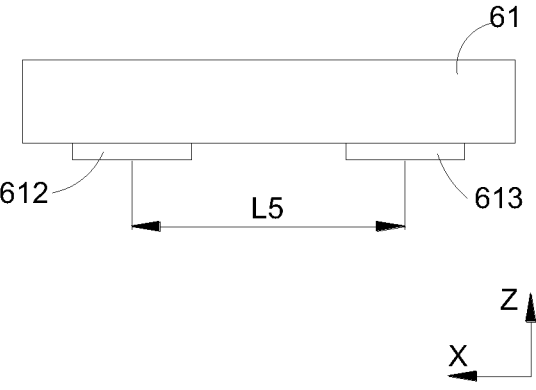
FIG. 14 is a front view of the test member in FIG. 13 according to one or more embodiments of the present disclosure.

In some embodiments, as shown in FIG. 14, the test member 61 includes a first test body 612 and a second test body 613 arranged opposite to each other along a first direction X. The abutment surface 611 includes a first abutment surface 6111 and a second abutment surface 6112. The first abutment surface 6111 is located on the first test body 612, and the second abutment surface 6112 is located on the second test body 613. The first direction X is the length direction or the width direction of the photovoltaic module 1. In some embodiments of the present disclosure, for example, the first direction X is the width direction of the photovoltaic module 1. In addition, as shown in FIG. 13, the test device further includes a second direction Z and a third direction Y. The second direction Z is the thickness direction of the photovoltaic module 1, and the third direction Y is the length direction of the photovoltaic module 1.

In one or more embodiments, the first test body 612 applies a load to the photovoltaic module 1 through the first abutment surface 6111, and the second test body 613 applies a load to the photovoltaic module 1 through the second abutment surface 6112. That is, the operator's standing on the surface of the photovoltaic module 1 is simulated through the first test body 612 and the second test body 613, so that the force on the photovoltaic module 1 during the test matches the force on the photovoltaic module 1 when the operator stands on the surface of the photovoltaic module 1 with both feet, which is conducive to improving the accuracy and reliability of the test results of the test device.

In some embodiments, as shown in FIG. 14, along the first direction X, a distance L5 between a geometric center of the first abutment surface 6111 and a geometric center of the second abutment surface 6112 satisfies: 100 mm≤L5≤500 mm. For example, the distance between the geometric center of the first abutment surface 6111 and the geometric center of the second abutment surface 6112 may be 100 mm, 260 mm, 318 mm, 439 mm, or 500 mm.

In one or more embodiments, if the distance between the geometric center of the first abutment surface 6111 and the geometric center of the second abutment surface 6112 is shorter or longer, that is, L5>500 mm or L5<100 mm, a distance between the first test body 612 and the second test body 613 in the first direction X is quite different from a distance between the operator's two feet, which easily leads to large deviations in the test results of the test device. Therefore, 100 mm≤L5≤500 mm enables the distance between the first test body 612 and the second test body 613 in the first direction X to match the distance between the operator's two feet, which is conducive to improving the accuracy and reliability of the test results of the test device.

In one or more embodiments, a contour shape of the first abutment surface 6111 and a contour shape of the second abutment surface 6112 are similar to a contour shape of the operator's shoe sole, so as to improve the accuracy and reliability of the test results of the test device. In one or more embodiments, the contour shape of the first abutment surface 6111 and the contour shape of the second abutment surface 6112 form a complete contour of the shoe sole, to increase the degree of matching between the contour shapes of the first abutment surface 6111 and the second abutment surface 6112 and the contour shape of the shoe sole. In other embodiments, the contour shape of the first abutment surface 6111 and the contour shape of the second abutment surface 6112 are similar to the contour shape of a sole or a heel of the shoe sole. In other embodiments, the first abutment surface 6111 includes a first surface 6111a and a second surface 6111b spaced apart from each other along the third direction Y, contour shape of the first surface 6111a is similar to a contour shape of a forefoot of the shoe sole, and a contour shape of the second surface 6111b is similar to a contour shape of a rear heel of the shoe sole, and the second abutment surface 6112 includes a third surface 6112a and a fourth surface 6112b spaced apart along the third direction Y, a contour shape of the third surface 6112a is similar to the contour shape of the forefoot of the shoe sole, and a contour shape of the fourth surface 6112b is similar to the contour shape of the rear heel of the shoe sole, so as to reduce machining costs of the test member 61.

In some other embodiments, the contour shape of the first abutment surface 6111 and the contour shape of the second abutment surface 6112 are circles, rectangles, ovals, or other shapes, so as to facilitate machining of the test member 61, thereby reducing the machining costs of the test member 61. In one or more embodiments, the first abutment surface 6111 and the second abutment surface 6112 are complete and continuous planes extending along the third direction Y. In some embodiments, the first abutment surface 6111 includes a first surface 6111a and a second surface 6111b spaced apart from one another along the third direction Y, a contour shape of the first surface 6111a and a contour shape of the second surface 6111b are circles, rectangles, ovals, or other shapes, and the second abutment surface 6112 includes a third surface 6112a and a fourth surface 6112b spaced apart along the third direction Y, a contour shape of the third surface 6112a and a contour shape of the fourth surface 6112b are circles, rectangles, ovals, or other shapes, so as to reduce materials required for machining the test member 61, thereby reducing the machining costs of the test member 61.

Figure 15:
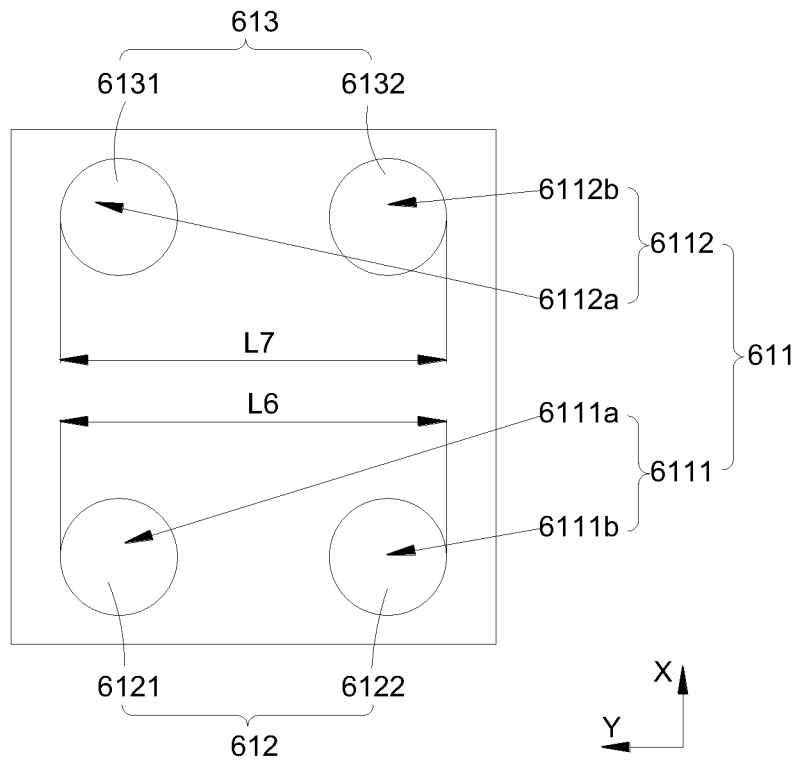
FIG. 15 is a bottom view of the test member in FIG. 14.
Figure 16:
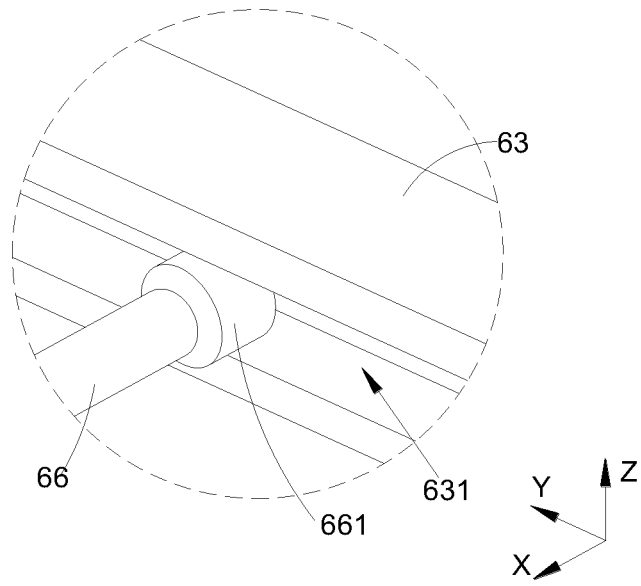
FIG. 16 is an enlarged view of Part II in FIG. 11.

In some embodiments of the present disclosure, the first abutment surface 6111 includes a first surface 6111a and a second surface 6111b spaced apart along the third direction Y, a contour shape of the first surface 6111a and a contour shape of the second surface 6111b are circles, and the second abutment surface 6112 includes a third surface 6112a and a fourth surface 6112b spaced apart along the third direction Y, a contour shape of the third surface 6112a and a contour shape of the fourth surface 6112b are circles. As shown in FIG. 15, the first test body 612 includes a first body 6121 and a second body 6122 arranged opposite to each other along the third direction Y, the first surface 6111a is arranged on the first body 6121, and the second surface 6111b is arranged on the second body 6122. The second test body 613 includes a third body 61131 and a fourth body 6132 arranged opposite to each other along the third direction Y, the third surface 6112a is arranged on the third body 61131, and the fourth surface 6112b is arranged on the fourth body 6132.

In some embodiments, as shown in FIG. 15, a length L6 of the first abutment surface 6111 in the third direction Y satisfies: 10 mm≤L6≤400 mm. That is, a maximum distance between an outer contour of the first surface 6111a and an outer contour of the second surface 6111b in the third direction Y ranges from 10 mm to 400 mm. For example, the maximum distance between the outer contour of the first surface 6111a and the outer contour of the second surface 6111b in the third direction Y may be 100 mm, 146 mm, 259 mm, 372 mm, or 400 mm. In other embodiments, a length L7 of the second abutment surface 6112 in the third direction Y satisfies: 100 mm≤L7≤400 mm. That is, a maximum distance between an outer contour of the third surface 6112*a* and an outer contour of the fourth surface 6112*b* in the third direction Y ranges from 10 mm to 400 mm. For example, the maximum distance between the outer contour of the third surface 6112*a* and the outer contour of the fourth surface 6112*b* in the third direction Y may be 100 mm, 146 mm, 259 mm, 372 mm, or 400 mm.

In one or more embodiments, if the length of the first abutment surface 6111 in the third direction Y is larger and the length of the second abutment surface 6112 in the third direction Y is larger, that is, L6>400 mm and L7>400 mm, or the length of the first abutment surface 6111 in the third direction Y is smaller and the length of the second abutment surface 6112 in the third direction Y is smaller, that is, L6<10 mm and L7<10 mm, contour dimensions of the first abutment surface 6111 and the second abutment surface 6112 are quite different from contour dimensions of the operator's shoe sole, which easily leads to large deviations in the test results of the test device. Therefore, 10 mm≤L6≤400 mm and 10 mm≤L7≤400 mm enable the contour dimensions of the first abutment surface 6111 and the second abutment surface 6112 in the third direction Y to match the contour dimensions of the operator's shoe sole, which is conducive to improving the accuracy and reliability of the test results of the test device.

In any one of the above embodiments, a buffer (not labelled in the figure) is mounted on the abutment surface 611. During the test, the abutment surface 611 abuts against the photovoltaic module 1 through the buffer, which reduces the risk of damages to the photovoltaic module 1 and the abutment surface 611 caused by direct contact of the abutment surface 611 with the surface of the photovoltaic module 1. At the same time, the buffer can simulate the operator's insole to improve accuracy and reliability of the test results.

The buffer may be made of silicone, plastics, and other materials having good elastic deformation. The specific material of the buffer is not limited in the present disclosure.

As shown in FIG. 13, the test device includes a base 62. In one or more embodiments, before the test device tests anti-stepping performance of the photovoltaic module 1, the photovoltaic module 1 is directly placed on the base 62, so as to shorten the mounting cycle of the photovoltaic module 1 and the test device, thereby shortening the test cycle of the anti-stepping performance of the photovoltaic module 1. In other embodiments, as shown in FIG. 13, before the test device tests the anti-stepping performance of the photovoltaic module 1, firstly, the photovoltaic module 1 is fixedly connected to the color steel tile 2 to form a photovoltaic assembly, and then the photovoltaic assembly is placed on the base 62. In this case, the base 62 is configured to bear the color steel tile 2, so as to improve accuracy and reliability of the test results of the test device. In other embodiments, the photovoltaic module 1 may be first fixed to another support structure and then placed on the base 62 for an anti-stepping performance test.

In one or more embodiments, the test member 61 is set as a mass block such as a weight or a barbell. That is, no connection relationship exists between the test member 61 and the base 62. During the test, the photovoltaic module 1 is first fixed to the base 62, and then the test member 61 is manually placed on the test point of the photovoltaic module 1. In one or more embodiments, the test member 61 is set as the mass block such as the weight or the barbell, which facilitates easy replacement of the test member 61, so that the test device can use test members 61 of different weights to perform multiple sets of tests on the photovoltaic module 1, thereby improving the accuracy of the test results of the test device.

In other embodiments, as shown in FIG. 13, the test device further includes a frame 63 extending along the second direction Z, the frame 63 is mounted on the base 62, the test member 61 is connected to the frame 63, and the test member 61 can move along the second direction Z. In one or more embodiments, the test member 61 is connected to the frame 63, and the test member 61 can move along the second direction Z, which reduces the risk of injuries caused by manual handling of the test member 61 during the test, thereby improving use safety of the test device.

In some embodiments, the test device further includes a drive assembly, and the test member 61 is connected to the frame 63 through the drive assembly. The drive assembly can drive the test member 61 to move along the first direction X and/or the third direction Y.

In one or more embodiments, the test member 61 is driven by the drive assembly to move, which simplifies the operator's operations during the test, thereby improving use experience of the operator. The drive assembly can drive the test member 61 to move synchronously along the first direction X and/or the third direction Y, which improves flexibility of the mounting position of the text piece 61 on the frame 63, so as to facilitate the test member 61 to test different test points of the photovoltaic module 1, thereby improving the operation performance of the test device. At the same time, the drive assembly drives the test member 61 to move, which is conducive to realizing automation of the test device, thereby simplifying the test process and shortening the test cycle.

As shown in FIG. 13, the drive assembly includes a first drive member 64, a second drive member (not labelled in the figure), and a third drive member (not labelled in the figure). The test member 61 is mounted on the frame 63 through the first drive member 64. The first drive member 64 is configured to drive the test member 61 to move in the second direction Z. The second drive member and the third drive member are configured to drive movement of the first drive member 64 in the first direction X and the third direction Y, thereby driving the test member 61 to move along the first direction X and the third direction Y.

The first drive member 64 is provided with a telescopic rod 641, and the test member 61 is mounted on the telescopic rod 641, so as to realize the movement of the test member 61 in the second direction Z.

The first drive member 64, the second drive member, and the third drive member are drive motors, and the telescopic rod 641 is a telescopic output shaft of the drive motor, so as to simplify structures of the first drive member 64, the second drive member, and the third drive member.

In addition, the test device further includes a connector 65. The test member 61 is connected with the telescopic rod 641 through the connector 65, so as to improve structural strength of the first drive member 64 and the test member 61 while reducing dimensions of the telescopic rod 641 and the test member 61 and reducing machining costs of the test member 61, thereby prolonging the service life of the first drive member 64 and the test member 61.

As shown in FIG. 13, the test device further includes a cantilever 66. Two ends of the cantilever 66 are connected to the frame 63, the first drive member 64 is connected to the cantilever 66, and the first drive member 64 can slide along an extension direction of the cantilever 66. The cantilever 66 is provided with a sliding portion 661, the frame 63 is provided with a sliding fit portion 631, at least part of the sliding portion 661 is located in the sliding fit portion 631, and the cantilever 66 can drive the first drive member 64 to slide along an extension direction of the sliding fit portion 631, thereby realizing movement of the first drive member 64 in the first direction X and the third direction Y.

The first drive member 64 is mounted on the frame 63 through the cantilever 66, which simplifies the way in which the first drive member 64 is connected to the frame 63, thereby simplifying structures of the first drive member 64 and the frame 63 and thus reducing overall machining costs of the test device.

In addition, the cantilever 66 and the frame 63 are connected through the sliding portion 661 and the sliding fit portion 631, which simplifies the way in which the cantilever 66 is connected to the frame 63, thereby simplifying structures of the cantilever 66 and the frame 63 and reducing machining costs of the cantilever 66 and the frame 63.

Some embodiments of the present disclosure are described based on an example in which the drive assembly drives the test member 61 to move.

Based on the above, as shown in FIG. 11 and FIG. 12, the method for testing a photovoltaic module according to some embodiments of the present disclosure includes: providing a photovoltaic module 1; performing external defect inspection on the photovoltaic module 1, and recording a test result as an external initial result; performing an internal defect test on the photovoltaic module 1, and recording a test result as an internal initial result; testing performance of the photovoltaic module 1, and recording a test result as an initial performance test result; performing an environmental aging test on the photovoltaic module 1, and recording a test result as a pre-aging result; placing the photovoltaic module 1 on a base 62 of a test device 6; driving, by a second drive member and/or a third drive member, a test member 61 to move, so that the test member 61 is located above a first test point 11 in the second direction Z, driving, by the first drive member 64, the test member 61 to move, and applying, by a test surface, a preset load to the first test point 11 and maintaining for a preset period; driving, by the second drive member and/or the third drive member, the test member 61 to move, so that the test member 61 is located above a second test point 12 in the second direction Z, driving, by the second drive member, the test member 61 to move, and applying, by the test surface, the preset load to the second test point 12 and maintaining for the preset period; driving, by the second drive member and/or the third drive member, the test member 61 to move, so that the test member 61 is located above a third test point 15 in the second direction Z, driving, by the first drive member 64, the test member 61 to move, and applying, by the test surface, the preset load to the third test point 15 and maintaining for the preset period; performing the internal defect test on the loaded photovoltaic module 1, and recording a test result as an internal loading result; performing the external defect inspection on the loaded photovoltaic module 1, and recording a test result as an external loading result; performing a performance test on the loaded photovoltaic module 1, and recording a test result as a loading performance test result; performing an IEC 61215-2 MQT 20 test on the loaded photovoltaic module 1; performing the environmental aging test on the loaded photovoltaic module 1, and recording a test result as a post-aging result; comparatively analyzing the external initial result and the external loading result, and determining a degree of change in an external defect of the loaded photovoltaic module 1; comparatively analyzing the internal initial result and the internal loading result, and determining a degree of change in an internal defect of the loaded photovoltaic module 1; comparatively analyzing the initial performance test result and the loading performance test result, and determining a degree of change in performance of the loaded photovoltaic module 1; comparatively analyzing the pre-aging result and the post-aging result, and determining a degree of environmental aging of the photovoltaic module 1; and determining the anti-stepping performance of the photovoltaic module 1 according to the degree of change in the external defect, the degree of change in the internal defect, the degree of change in the performance, and the degree of environmental aging of the photovoltaic module 1.

Orders and numbers of times of the internal defect test, the external defect test, the IEC 61215-2 MQT 20 test, and the environmental aging test are not limited in the present disclosure.

The above are merely preferred embodiments of the present disclosure and are not intended to limit the present disclosure. For those skilled in the art, the present disclosure may be subject to various changes and variations. Any modification, equivalent replacement, improvement, and the like made within the spirit and principles of the present disclosure shall fall within the protection scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for testing a photovoltaic module, applied for testing anti-stepping performance of the photovoltaic module, wherein the method comprises:

performing a defect inspection test on the photovoltaic module, and recording a test result as an initial result;

mounting the photovoltaic module on a color steel tile assembly;

applying a preset load to the photovoltaic module by using a test device and maintaining for a preset period;

performing the defect inspection test on the loaded photovoltaic module, and recording a test result as a loading result; and comparatively analyzing the initial result and the loading result, wherein the test device comprises a drive assembly and a test member configured to apply the preset load to the photovoltaic module, the drive assembly is capable of driving the test member to move along a length direction, a width direction, and a thickness direction of the photovoltaic module, and the test member comprises a first test body and a second test body spaced apart along a width direction of the photovoltaic module, a first abutment surface is located on the first test body, and a second abutment surface is located on the second test body; and wherein the applying a preset load to the photovoltaic module by using a test device comprises:

applying the preset load to the photovoltaic module by driving, via the drive assembly, the first test body through the first abutment surface and the second test body through the second abutment surface.

2. The method for testing a photovoltaic module according to claim 1, wherein the photovoltaic module comprises a connecting portion configured to contact the color steel tile assembly and an unsupported portion configured to define a cavity with the color steel tile assembly;

the photovoltaic module is provided with a first test surface, a second test surface, and a third test surface, the first test surface is located at an edge of the connecting portion, the second test surface is located at the unsupported portion, and the third test surface is located at a corner of the photovoltaic module; and the applying a preset load to the photovoltaic module by using a test device and maintaining for a preset period comprises:

applying the preset load to at least one of the first test surface, the second test surface, and the third test surface by using the test device and maintaining for the preset period.

3. The method for testing a photovoltaic module according to claim 2, wherein the applying the preset load to at least one of the first test surface, the second test surface, and the third test surface by using the test device and maintaining for the preset period comprises:

selecting a first test point on the first test surface, the second test surface, or the third test surface; and applying the preset load to the first test point by using the test device and maintaining for the preset period.

4. The method for testing a photovoltaic module according to claim 3, wherein, subsequent to the applying the preset load to the first test point by using the test device and maintaining for the preset period, the method further comprises:

selecting a second test point on the first test surface, the second test surface, or the third test surface, wherein the first test point and the second test point are distributed along a length direction and/or a width direction of the photovoltaic module; and applying the preset load to the second test point by using the test device and maintaining for the preset period.

5. The method for testing a photovoltaic module according to claim 4, wherein the first test point and the second test point are located on a same one of the first test surface, the second test surface, and the third test surface; or the first test point and the second test point are located on two of the first test surface, the second test surface, and the third test surface, respectively.

6. The method for testing a photovoltaic module according to claim 2, wherein the photovoltaic module is further provided with a fourth test surface, the fourth test surface is a surface other than the first test surface, the second test surface, and the third test surface; and the applying a preset load to the photovoltaic module by using a test device and maintaining for a preset period comprises:

applying the preset load to the fourth test surface by using the test device and maintaining for the preset period.

7. The method for testing a photovoltaic module according to claim 4, wherein the applying a preset load to the photovoltaic module by using a test device and maintaining for a preset period comprises:

driving, by the drive assembly, the test member to move along the length direction and/or the width direction of the photovoltaic module, so that the test member is located above the first test point in the thickness direction of the photovoltaic module;

driving, by the drive assembly, the test member to move along the thickness direction of the photovoltaic module, and applying, by the test member, the preset load to the first test point and maintaining for the preset period;

driving, by the drive assembly, the test member to move along the length direction and/or the width direction of the photovoltaic module, so that the test member is located above the second test point in the thickness direction of the photovoltaic module; and driving, by the drive assembly, the test member to move along the thickness direction of the photovoltaic module, and applying, by the test member, the preset load to the second test point and maintaining for the preset period.

8. The method for testing a photovoltaic module according to claim 1, wherein the defect inspection test comprises appearance inspection;

the performing a defect inspection test on the photovoltaic module, and recording a test result as an initial result comprises:

inspecting an appearance of the photovoltaic module, and recording a number and a size of appearance defects of the photovoltaic module as an appearance initial result;

the performing the defect inspection test on the loaded photovoltaic module, and recording a test result as a loading result comprises:

inspecting an appearance of the loaded photovoltaic module, and recording a number and a size of appearance defects of the photovoltaic module as an appearance loading result; and the comparatively analyzing the initial result and the loading result comprises:

comparatively analyzing the appearance initial result and the appearance loading result, and determining a degree of change in the appearance of the loaded photovoltaic module;

wherein the appearance inspection comprises external defect inspection and/or an internal defect test, and/or wherein the defect inspection test comprises a performance test;

the performing a defect inspection test on the photovoltaic module, and recording a test result as an initial result comprises:

testing performance of the photovoltaic module, and recording a test result as an initial performance test result;

the performing the defect inspection test on the loaded photovoltaic module, and recording a test result as a loading result comprises:

testing performance of the loaded photovoltaic module, and recording a test result as a loading performance test result; and the comparatively analyzing the initial result and the loading result comprises:

comparatively analyzing the initial performance test result and the loading performance test result, and determining a degree of change in the performance of the loaded photovoltaic module, and/or wherein the defect inspection test comprises an environmental aging test;

the performing a defect inspection test on the photovoltaic module, and recording a test result as an initial result comprises:

performing the environmental aging test on the photovoltaic module, and recording a test result as a pre-aging result;

the performing the defect inspection test on the loaded photovoltaic module, and recording a test result as a loading result comprises:

performing the environmental aging test on the loaded photovoltaic module, and recording a test result as a post-aging result; and the comparatively analyzing the initial result and the loading result comprises:

comparatively analyzing the pre-aging result and the post-aging result, and determining a degree of environmental aging of the loaded photovoltaic module.

9. The method for testing a photovoltaic module according to claim 1, wherein, subsequent to the applying a preset load to the photovoltaic module by using a test device and maintaining for a preset period, the method further comprises:

performing an international electrotechnical commission (IEC) 61215-2 module qualification test (MQT) 20 test on the photovoltaic module.

10. The method for testing a photovoltaic module according to claim 1, wherein the preset period is equal to or greater than 20 minutes.

11. The method for testing a photovoltaic module according to claim 1, wherein along the width direction, a distance L1 between a geometric center of the first abutment surface and a geometric center of the second abutment surface satisfies: $100 \text{ mm} \leq L1 \leq 500 \text{ mm}$.

12. The method for testing a photovoltaic module according to claim 1, wherein a contour shape of the first abutment surface and a contour shape of the second abutment surface are similar to a contour shape of an operator's shoe sole.

13. The method for testing a photovoltaic module according to claim 1, wherein the first abutment surface comprises a first surface and a second surface spaced apart along the length direction, and a contour shape of the first surface and a contour shape of the second surface are circles, the second abutment surface comprises a third surface and a fourth surface spaced apart along the length direction, and a contour shape of the third surface and a contour shape of the fourth surface are circles; and the first test body comprises a first body and a second body arranged opposite to each other along the length direction, the first surface is arranged on the first body, the second surface is arranged on the second body, the second test body comprises a third body and a fourth body arranged opposite to each other along the length direction, the third surface is arranged on the third body, and the fourth surface is arranged on the fourth body.

* * * * *